United States Patent
Hosseinkhani Loorak et al.

(10) Patent No.: US 11,693,482 B2
(45) Date of Patent: Jul. 4, 2023

(54) SYSTEMS AND METHODS FOR CONTROLLING VIRTUAL WIDGETS IN A GESTURE-CONTROLLED DEVICE

(71) Applicants: Mona Hosseinkhani Loorak, Markham (CA); Wei Zhou, Richmond Hill (CA); Gaganpreet Singh, Markham (CA); Xiu Yi, Thornhill (CA); Wei Li, Markham (CA)

(72) Inventors: Mona Hosseinkhani Loorak, Markham (CA); Wei Zhou, Richmond Hill (CA); Gaganpreet Singh, Markham (CA); Xiu Yi, Thornhill (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/334,324

(22) Filed: May 28, 2021

(65) Prior Publication Data

US 2022/0382377 A1 Dec. 1, 2022

(51) Int. Cl.
G06F 3/01 (2006.01)
G06F 3/0482 (2013.01)
G06F 3/04815 (2022.01)
G06V 20/40 (2022.01)
G06V 40/20 (2022.01)
G06V 40/10 (2022.01)

(52) U.S. Cl.
CPC ............ G06F 3/017 (2013.01); G06F 3/0482 (2013.01); G06F 3/04815 (2013.01);
(Continued)

(58) Field of Classification Search
CPC .... G06F 3/017; G06F 3/04815; G06F 3/0482; G06V 20/46; G06V 40/107; G06V 40/28
See application file for complete search history.

(56) References Cited

U.S. PATENT DOCUMENTS

2009/0315740 A1* 12/2009 Hildreth ................. G06F 3/017
341/20
2014/0201666 A1* 7/2014 Bedikian ............... G06V 40/20
715/771
(Continued)

FOREIGN PATENT DOCUMENTS

| CN | 103809733 A | 5/2014 |
| CN | 105843371 A | 8/2016 |
| CN | 109948511 A | 6/2019 |

OTHER PUBLICATIONS

Arora et al. Youtube "MagicalHands: Mid-Air Hand Gesture for Animating in VR (USIST 2019)". (Year: 2019).*
(Continued)

*Primary Examiner* — Cao H Nguyen

(57) ABSTRACT

A gesture-controlled device and a method thereon are provided. The method includes capturing a plurality of video frames of a user's body and processing the plurality of video frames to allow detecting a portion of the user's body and to allow recognizing hand gestures. In response to detecting the portion of the user's body, the method includes generating at least one widget interaction region corresponding to the portion of the user's body. The method further includes recognizing, a mid-air hand gesture in the at least one widget interaction region, mapping the mid-air hand gesture to at least one virtual widget on the gesture-controlled device, and manipulating the at least one virtual widget based on the mid-air hand gesture. The method and device allow manipulation of virtual widgets using mid-air gestures on a gesture-controlled device.

20 Claims, 28 Drawing Sheets

(52) U.S. Cl.
CPC ............ G06V 20/46 (2022.01); G06V 40/107 (2022.01); G06V 40/28 (2022.01)

(56) References Cited

U.S. PATENT DOCUMENTS

| | | | |
|---|---|---|---|
| 2016/0062473 A1* | 3/2016 | Bouchat | G06F 3/011 345/156 |
| 2017/0293364 A1* | 10/2017 | Wang | G06V 40/113 |
| 2019/0196591 A1 | 6/2019 | Long et al. | |
| 2021/0333884 A1* | 10/2021 | Li | G06T 7/20 |

OTHER PUBLICATIONS

Gustafson, S. et al., "Imaginary Phone: Learning Imaginary Interfaces by Transferring Spatial Memory from a Familiar Device", UIST'11, Oct. 16-19, 2011, Santa Barbara, California, USA.

Hamdan, N. A.-H. et al, "Run&Tap: Investigation of On-Body Tapping for Runners", ISS'17, Oct. 17-20, 2017, Brighton, United Kingdom.

Li, F. C. Y. et al., "Virtual Shelves: Interactions with Orientation Aware Devices", UIST'09, Oct. 4-7, 2009, Victoria, British Columbia, Canada.

Gustafson, S. et al., "Imaginary Interfaces: Spatial Interaction with Empty Hands and without Visual Feedback", UIST'10, Oct. 3-6, 2010, New York, New York, USA.

Uddin, M. S. et al., "HandMark Menus: Rapid Command Selection and Large Command Sets on Multi-Touch Displays", CHI'16, May 7-12, 2016, San Jose, CA, USA.

Popovici, I et al. "Hover: Exploring Cognitive Maps and Mid-Air Pointing for Television Control" International Journal of Human-Computer Studies 129(1); Apr. 2019.

* cited by examiner

SYSTEMS AND METHODS FOR CONTROLLING VIRTUAL WIDGETS IN A GESTURE-CONTROLLED DEVICE

FIELD

This disclosure relates generally to gesture-controlled devices and more particularly to a systems and methods for controlling virtual widgets in a gesture-controlled device.

BACKGROUND

Traditionally, a pointing device, such as a hand-held mouse, a human finger, or a stylus, has been used by a user of an electronic device to control and provide data to the electronic device using physical gestures. For example, moving a hand-held mouse across a physical surface and activating switches (e.g., by pressing buttons) on the mouse enables a user to interact with (i.e., to control and provide data to) an electronic device. Similarly, a touch of a human finger or stylus on a touch-sensitive surface of an electronic device, such as a trackpad or touchscreen display of the electronic device, and movement of the finger or stylus on the touch-sensitive surface enables a user to interact with (i.e., to control and provide data to) the electronic device.

Some modern electronic devices, such a televisions, large display screen, vehicle infotainment systems, may enable a user to interact with (i.e. to control and provide data to) such electronic devices using gestures performed in a space in front of the electronic device. The gestures can be captured in a field of view (FOV) of an image-capturing device, such as a digital camera of the electronic device or a digital camera connected to the electronic device. Such gestures are referred to as mid-air gestures. Electronic devices able to accept input via mid-air gestures are termed "gesture-controlled devices".

Due to the advancement in sensing technology, the use of body landmarks for interaction with electronic devices has been proposed as an alternate method of providing user input to an electronic device. Research has shown that using body landmarks for performing gesture-based interactions with electronic devices can help with spatial memory and assist with complex interface tasks. Gesture-based interactions using body landmarks typically fall into one of two categories: on-body interactions and around-body mid-air interactions.

In on-body interactions, users interact with a system, such as an electronic device, by touching different landmarks of their body. Depending on the landmark being touched, various interactions with the system are triggered. In one example, an imaginary interface of a phone is projected on a user's palm. In another example, on-body tapping interactions are considered as potential input techniques for runners so they can interact with their smartphones without handling them. Although on-body interactions provide possible mechanisms for users to interact with their electronic devices, applying hands to the human body may be contrary to hygiene guidelines or may be inconvenient for users in some specific use scenarios.

In around-body interactions, mid-air gestures are performed in the air relative to the user's body without touching body landmarks. Such mid-air gestures take advantage of body landmarks for improving the usability of their interactions. As one example, the user may choose a movie genre to watch on a TV by performing a mid-air gesture in a particular region of space relative to their body. As another example, application shortcuts are arranged in space as if on shelves allowing the user to trigger an application by orienting a spatially aware mobile device within the circular hemisphere around her. Despite the advantages of the around-body mid-air interactions, most are only concerned with simple and discrete target selection tasks.

SUMMARY

In one aspect of the present disclosure, there is provided a method including capturing, by an image-capturing device of a gesture-controlled device, a plurality of video frames of a user's body. The method further includes processing, by a gesture-sensing system, the plurality of video frames to allow detecting a portion of the user's body and to allow recognizing hand gestures. In response to detecting the portion of the user's body, the method includes generating, by a widget interaction region generation subsystem, at least one widget interaction region corresponding to the portion of the user's body. The method further includes recognizing, by a gesture recognition subsystem, a mid-air hand gesture in the at least one widget interaction region, mapping, by a widget mapping subsystem, the mid-air hand gesture to at least one virtual widget on the gesture-controlled device, and manipulating the at least one virtual widget based on the mid-air hand gesture.

Advantageously, at least one virtual widget can be manipulated using a mid-air gesture, which corresponds thereto. This allows controlling a gesture-controlled device, which does not have a display by using the user's body as a point of reference, which determines the location, or position of the virtual widget that the user wishes to manipulate.

The method may further include extracting an absolute location of a graphical widget of a user interface, and mapping the graphical widget to the at least one virtual widget in a widget interaction region. This allows accurate manipulation of a graphical widget based on its location within a user interface. Accordingly, the correct functionality, corresponding to the graphical widget, is activated.

The at least one virtual widget may comprise a plurality of virtual widgets; and the virtual widgets are predefined in the at least one widget interaction region.

Recognizing the mid-air hand gesture may comprise determining a gesture type of the mid-air hand gesture, and wherein mapping the mid-air hand gesture to the at least one virtual widget is based on the gesture type of the mid-air hand gesture.

Manipulating the at least one virtual widget may only be done when the gesture type of the mid-air hand gesture corresponds to a type of the at least one virtual widget. This prevents accidental activation of a virtual widget when the recognized mid-air gesture is of a non-matching type. Accordingly, any functionality, which is unintended, will not be triggered thus averting any malfunctioning of a device associated with the activation of the virtual widget.

The mid-air hand gesture may comprise a mid-air tapping hand gesture, the at least one virtual widget may comprise one of: a push button control, a radio button control, and a check box control, and manipulating the at least one virtual widget may comprise activating one of: the push button control, the radio button control and the check box control.

The mid-air hand gesture may comprise a push mid-air hand gesture or a push-and-release mid-air hand gesture, the at least one virtual widget may comprise a toggle push button, and manipulating the at least one virtual widget comprises toggling the toggle push button. A virtual widget which comprises a toggle push button may be advantageous to use in a vehicle in order to enable or disable functions without having to look at a display which would be distracting.

The mid-air hand gesture may comprise a mid-air slap gesture or a mid-air swipe gesture, the at least one virtual widget may comprise a carousel, and manipulating the at least one virtual widget may comprise rotating the carousel based on a direction of the mid-air slap gesture or the mid-air swipe gesture.

The mid-air hand gesture may comprise a dragging mid-air hand gesture and recognizing the mid-air hand gesture may comprise determining a dragging direction of the dragging mid-air hand gesture. The at least one virtual widget may comprise a slider control and manipulating the at least one virtual widget may comprise moving a sliding element of the slider control in the dragging direction.

The at least one virtual widget comprises a plurality of virtual widgets. Generating the at least one widget interaction region may comprise generating a plurality of widget interaction regions equal in number to a number of virtual widgets in the plurality of virtual widgets. Mapping, the mid-air hand gesture to the at least one virtual widget may be based on the recognizing of the mid-air hand gesture in a widget interaction of the plurality of widget interaction regions corresponding to the at least one virtual widget. This facilitates manipulating any one of a number of virtual widgets based on a relative location with respect to the user's body.

In another aspect of the present disclosure, there is provided a gesture-controlled device comprising an image-capturing device, a processor and a memory coupled to the processor. The memory is storing machine-executable instructions which, when executed by the processor, cause the gesture-controlled device to capture, by the image-capturing device, a plurality of video frames of a user's body. The instructions further configure the gesture-controlled device to detect a portion of the user's body in the plurality of video frames; in response to detecting the portion of the user's body, generate, at least one widget interaction region corresponding to the portion of the user's body; recognize a mid-air hand gesture in the at least one widget interaction region; map the mid-air hand gesture to at least one virtual widget associated with the gesture-controlled device; and manipulate the at least one virtual widget based on the mid-air hand gesture.

Advantageously, at least one virtual widget can be manipulated using a mid-air gesture, which corresponds thereto. This allows controlling a gesture-controlled device, which does not have a display by using the user's body as a point of reference, which determines the location, or position of the virtual widget that the user wishes to manipulate.

In some examples, the machine-executable instructions further cause the gesture-controlled device to extract an absolute location of a graphical widget of a user interface of the gesture-controlled device, and map the graphical widget to the at least one virtual widget in the at least one widget interaction region. This allows accurate manipulation of a graphical widget based on its location within a user interface. Accordingly, the correct functionality, corresponding to the graphical widget, is activated.

In some examples, the at least one virtual widget comprises a plurality of virtual widgets and the plurality of the virtual widgets are predefined in the at least one widget interaction region.

In some examples, the machine-executable instructions which cause the gesture-controlled device to recognize the mid-air hand gesture comprise machine-executable instructions which cause the gesture-controlled device to determine a gesture type of the mid-air hand gesture, and wherein mapping the mid-air hand gesture to the at least one virtual widget is based on the gesture type of the mid-air hand gesture.

In some examples, the machine-executable instructions which cause the gesture-controlled device to manipulate the at least one virtual widget is only done when the gesture type of the mid-air hand gesture corresponds to a type of the at least one virtual widget. This prevents accidental activation of a virtual widget when the recognized mid-air gesture is of a non-matching type. Accordingly, any functionality, which is unintended, will not be triggered thus averting any malfunctioning of a device associated with the activation of the virtual widget In some examples, the mid-air hand gesture comprises a mid-air tapping hand gesture; the at least one virtual widget comprises one of: a push button control, a radio button control, and a check box control; and the instructions which cause the gesture-controlled device to manipulate the at least one virtual widget comprise instructions which cause the gesture-controlled device to activate one of: the push button control, the radio button control, and the check box control.

In some examples, the mid-air hand gesture comprises a push mid-air hand gesture or a push-and-release mid-air hand gesture; the at least one virtual widget comprises a toggle push button; and the instructions which cause the gesture-controlled device to manipulate the at least one virtual widget comprise instructions which cause the gesture-controlled device to toggling the toggle push button.

In some examples, the mid-air hand gesture comprises a mid-air slap gesture or a mid-air swipe gesture; the at least one virtual widget comprises a carousel; and the instructions which cause the gesture-controlled device to manipulate the at least one virtual widget comprise instructions which cause the gesture-controlled device to rotate the carousel based on a direction of the mid-air slap gesture or the mid-air swipe gesture.

In some examples, the mid-air hand gesture comprises a dragging mid-air hand gesture; the instructions which cause the gesture-controlled device to recognize the mid-air hand gesture comprise instructions which cause the gesture-controlled device to determine a dragging direction of the dragging mid-air hand gesture; the at least one virtual widget comprises a slider control; and the instructions which cause the gesture-controlled device to manipulate the at least one virtual widget comprise instructions which cause the gesture-controlled device to move a sliding element of the slider control in the dragging direction.

In yet another aspect of the present disclosure, there is provided a non-transitory computer-readable medium having machine-executable instructions stored thereon. The machine-executable instructions, when executed by a processor of a gesture-controlled device, cause the gesture-controlled device to capture, by an image-capturing device of the gesture-controlled device, a plurality of video frames of a user's body; detect a portion of the user's body in the plurality of video frames; in response to detecting the portion of the user's body, generate, at least one widget interaction region corresponding to the portion of the user's body; recognize a mid-air hand gesture in the at least one widget interaction region; map the mid-air hand gesture to at least one virtual widget associated with the gesture-controlled device; and manipulate the at least one virtual widget based on the mid-air hand gesture.

Advantageously, at least one virtual widget can be manipulated using a mid-air gesture, which corresponds thereto. This allows controlling a gesture-controlled device, which does not have a display, by using the user's body as a point of reference, which determines the location or position of the virtual widget that the user wishes to manipulate.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

Figure 1:
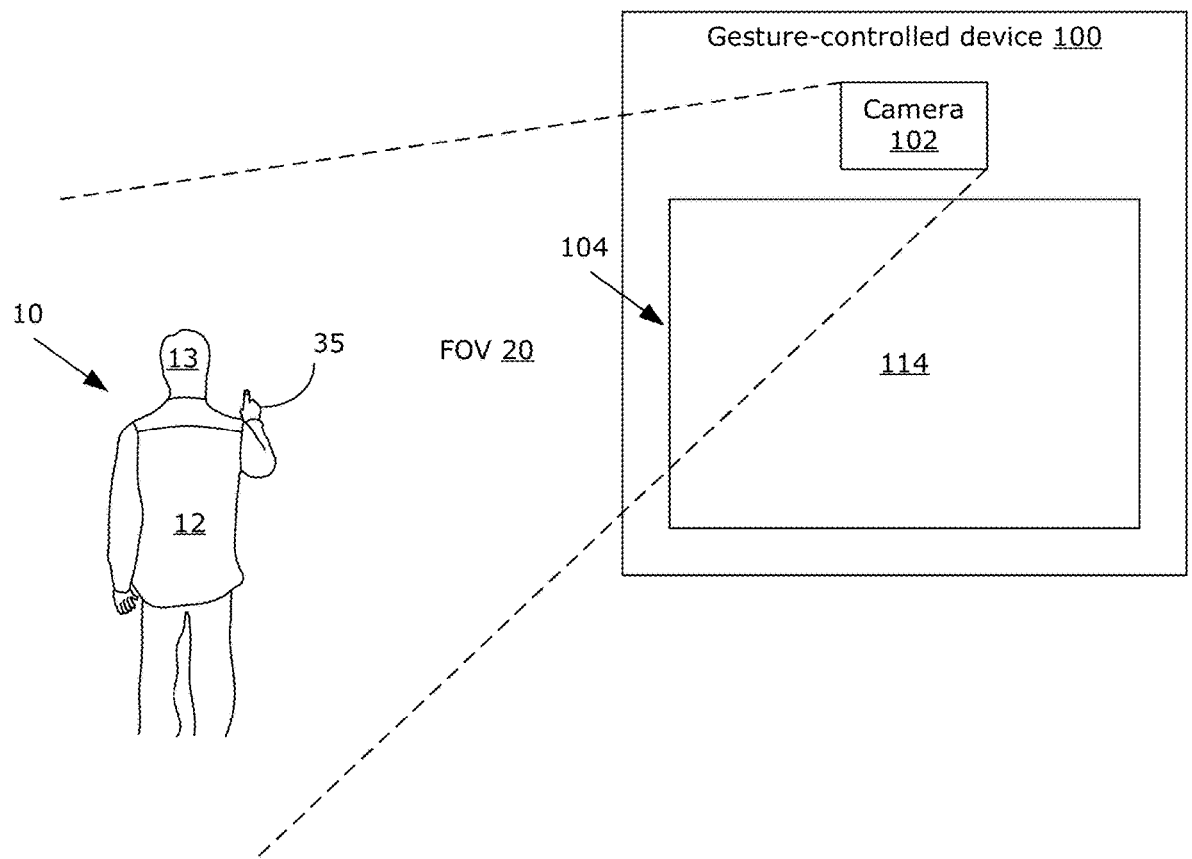
FIG. 1 is a block diagram illustrating a user interacting with an example gesture-controlled device.

Gesture-controlled devices are able to accept input via mid-air gestures. However, controlling virtual widgets by gesture-controlled devices using mid-air gestures poses some challenges. There are a number of ways in which virtual widgets are created. In some embodiments, virtual graphical widgets are predefined. In other embodiments, virtual graphical widgets are generated based on a graphical interface displayed on a display of a gesture-controlled device. It may be difficult to associate a detected mid-air gesture with a particular virtual widget. As a result, the wrong virtual widget may be controlled by a mid-air gesture. When virtual widgets are configured to control associated devices, machinery or industrial processes, then unintended consequences, which are undesired and even potentially dangerous, could occur if the wrong virtual widget is controlled or adjusted.

In various examples, the present disclosure describes methods and systems for controlling virtual widgets associated with a gesture-controlled device.

A virtual widget is a metaphor, which simulates the functionality of a physical control. In some embodiments, the virtual widget may be graphically represented on a display of an electronic device. In other embodiments, the virtual widgets are not represented either because the associated device has no display or because the displaying of a graphical representation is temporarily disabled (e.g. to prevent distraction). For example, a playback button control on a physical device such as a video cassette player, a DVD player, or a Blue Ray player may be implemented as a virtual widget in the form of a playback button control, which may or may not be rendered on the display of an electronic device. Similarly, a physical slider volume control on a stereo receiver may be implemented as a virtual widget in the form of a virtual slider control. Virtual widgets may also be configured to control machinery, vehicles or industrial processes. For example, button controls may start or stop machines and vehicles, or may initiate or stop industrial process steps. Similarly, slider controls may be used to vary industrial process parameters such as temperature, pressure and humidity.

A gesture-controlled device may be a television (e.g., smart TV), a desktop device, a videoconferencing system, a video gaming system, a vehicle-coupled device (e.g., a dashboard device), or a smart speaker, among other possibilities. The methods and systems described herein may be used to enable user interaction with virtual widgets forming part of any user interface provided by the gesture-controlled device. In some embodiments, the user interface is not rendered on a display either because the gesture-controlled device does not have a display or is in a mode of operation which turns off the display. In other embodiments the user interface includes user interfaces rendered on a display device of gesture-controlled device, and user interfaces rendered on a display device in communication with the gesture-controlled device. Examples of the methods and systems of the present disclosure may also be implemented for augmented reality (AR) or virtual reality (VR) applications, among other possibilities.

For simplicity, the present disclosure describes examples in the context of a gesture-controlled device 100 having a display 104 (e.g., a smart television (TV) or a display device in communication with a videoconferencing system) showing a media player application. The present disclosure describes methods and systems for controlling or interacting the media player application. For example, systems and methods for playback, fast-forwarding, and rewinding of a video; and for controlling features such as display brightness, display contrast and audio volume are described. However, it should be understood that the present disclosure is not limited to such embodiments, and that the methods and systems described herein may be used for controlling of a variety of gesture-controlled devices running a variety of applications. For example, some embodiments of the methods and system described herein may use other output devices, such as an audio speaker, to provide feedback information to users. Some embodiments may enable users to use mid-air hand gestures to interact with other types of content or other software applications, such as a music player, a videoconferencing application, a video game, a virtual reality (VR) or an augmented reality (AR) environment, among other possibilities.

In this disclosure, a "hand gesture" refers to a mid-air hand gesture in which a human hand has assumed a particular configuration or the human hand has moved in a particular way in mid-air. A hand configuration refers to a shape assumed by the hand including positioning of the fingers in a certain way. In the present disclosure, the terms "mid-air gesture", "hand gesture", and "gesture" shall be used interchangeably to refer to a gesture performed by a user's hand within the field of view of a camera, as described in further detail below. The way in which the hand is moved may define a gesture type. For example, when a hand is moved in a straight line whether vertically, horizontally or at an angle, the gesture type may be called a "dragging" gesture type. As another example, when a hand is tapped as if touching a button or a surface, the gesture type is a "tapping" gesture. As another example, when the hand is tilted at the wrist as if slapping someone, the gesture type is a "slap" or "slapping" gesture.

The use of mid-air hand gestures for controlling a gesture-controlled device may have advantages over other input modalities for controlling such devices. Using mid-air hand gestures to control such gesture-controlled devices does not require users to hold such devices for interaction therewith. Furthermore, using mid-air hand gestures for controlling such devices may be more hygienic, as users are not required to touch a surface of the gesture-controlled device to interact therewith.

The methods and systems described herein utilize mid-air gestures performed as around-body interactions to control virtual widgets associated with gesture-control devices. The use of around-body interactions, i.e. using the user's body as a reference, facilitates selecting the virtual widget that needs to be controlled. This is done based on the virtual widget's location in relation to the gesture-controlled device and the position of the mid-air gesture relative to the user's body. Additionally, different virtual widgets have a number of predefined mid-air gestures associated therewith. For example, a button control may only respond to a hover or a tap mid-air gesture and ignores other gestures. The association between the location and type of mid-air gesture relative to the user's body and the virtual widget makes it unlikely that the wrong virtual widget may be accidentally actuated or controlled. This ensures the accurate control of devices, machines, vehicles or industrial processes, which are controlled by the virtual widgets of the gesture-controlled device.

The examples presented herein relate to mid-air gestures performed in relation to a user's upper body 12. However, it would be apparent to those of skill in the art that other parts of a user's body may be used as a reference. For example, mid-air gestures may be performed in relation to a user's head 13 and be used by a gesture-controlled device 100 to control at least one virtual widget.

FIG. 1 shows an example of a user 10 interacting with a gesture-controlled device 100. In this simplified diagram, the gesture-controlled device 100 includes an image-capturing device, such as a digital camera 102 that captures frames in a field-of-view (FOV) 20. The FOV 20 may include at least a portion of the user 10, such as the upper body 12 and head 13, and a hand 35 of the user 10, as discussed further below. Notably, the FOV 20 in real-life use (e.g., outside of a laboratory setting) typically includes more than just the user 10. For example, the FOV 20 may also include other objects, a background scene, or possible other humans. The gesture-controlled device 100 may, instead of the digital camera 102, have another sensor (not shown) capable of detecting the user's upper body 12 or head 13, and sensing mid-air hand gestures from the user 10. For example, any image capturing device/sensor (e.g., an infrared image sensor) may be used to detect the user's head 13, upper body 12 or mid-air hand gestures by the user's hand 35. The gesture-controlled device 100 also includes a display device 104 (hereinafter referred to as display 104) for rendering visual information thereon, such as the user interface of a media player application or an audiovisual control as will be described below.

Figure 2:
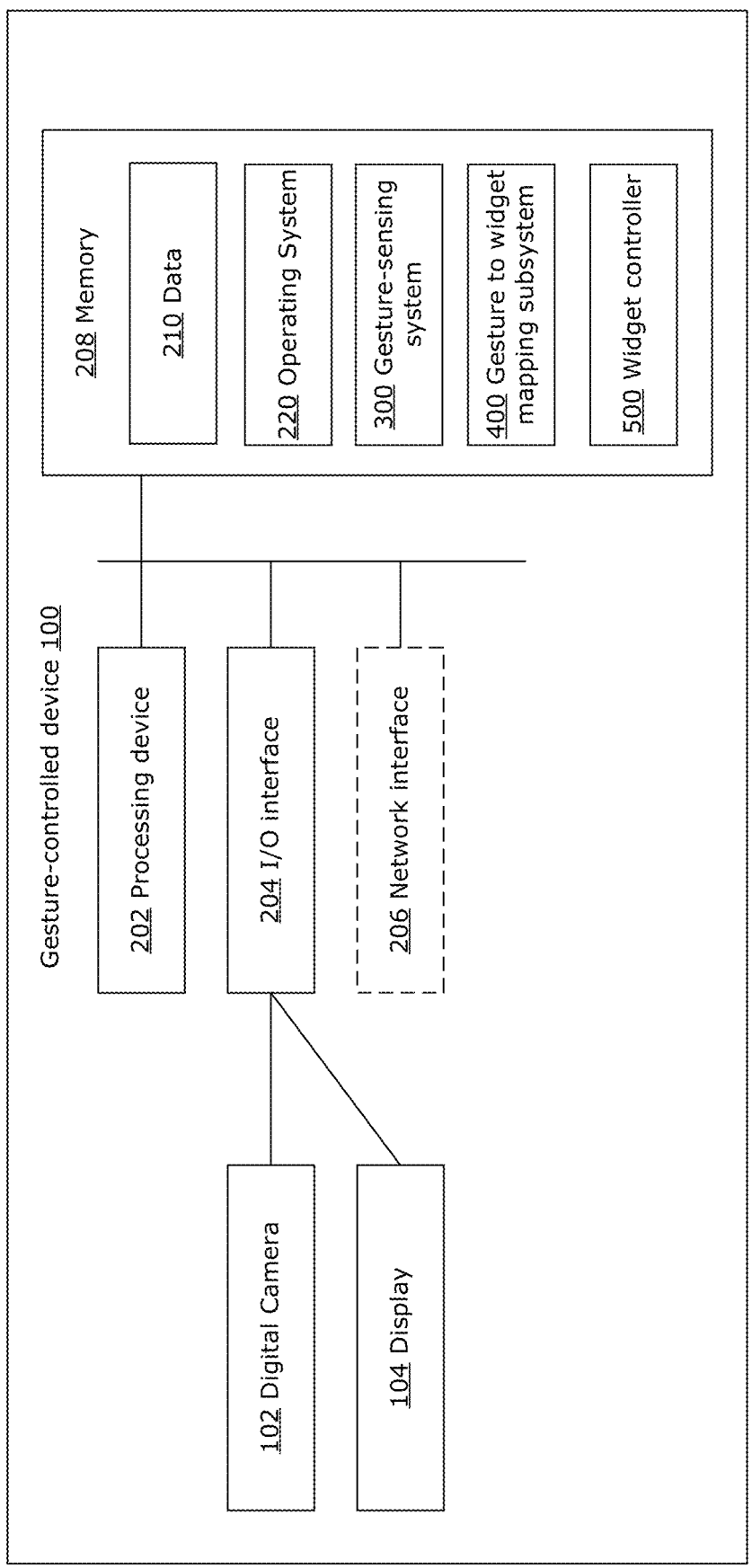
FIG. 2 is a block diagram illustrating some components of the gesture-controlled device of FIG. 1, in accordance with embodiments of the present disclosure.

FIG. 2 is a block diagram showing some components of the gesture-controlled device 100. Although an example embodiment of the gesture-controlled device 100 is shown and discussed below, other embodiments may be used to implement examples disclosed herein, which may include components different from those shown. Although FIG. 2 shows a single instance of each component, there may be multiple instances of each component shown.

The gesture-controlled device 100 includes one or more processing devices 202, such as a processor, a microprocessor, an application-specific integrated circuit (ASIC), a field-programmable gate array (FPGA), a dedicated logic circuitry, a dedicated artificial intelligence processor unit, or combinations thereof. The gesture-controlled device 100 also includes one or more input/output (I/O) interfaces 204, which interfaces input devices such as the digital camera 102 and output devices such as the display 104. The gesture-controlled device 100 may include other input devices (e.g., buttons, microphone, touchscreen, keyboard, etc.) and other output devices (e.g., speaker, vibration unit, etc.). The digital camera 102 (or other input device) may have capabilities for capturing live gesture input as a sequence of video frames. The captured frames may be buffered by the I/O interface(s) 204 and provided to the processing device(s) 202 to be processed in real-time or near real-time (e.g., within 10 ms).

The gesture-controlled device 100 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processing device(s) 202, such as to carry out examples described in the present disclosure. For example, the memory(ies) 208 may include instructions for executing a gesture-sensing system 300 for detecting and recognizing mid-air hand gestures performed by the user 10 through their hand 35. The memory(ies) may also include instructions for a gesture to widget mapping subsystem 400 that maps the detected mid-air hand gestures to virtual widgets displayed on the display 104. The memory(ies) 208 may include other software instructions, such as for implementing an operating system 220 and other applications/functions. The memory(ies) 208 may also include a widget controller 500 for activating virtual widgets mapped by the widget mapping subsystem 400, as will be described below. The memory(ies) 208 may also include data 210, such as video content files that may be presented to users via the display 104.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with each other via a bus, for example.

In some embodiments, a distributed system may include multiple gesture-controlled devices 100 as well as, optionally, one or more additional components. The distributed system may include multiple gesture-controlled devices 100 in communication with each other over a network; for example, a videoconferencing system may comprise a gesture-controlled device 100 for each remotely participating user, with optionally a central server. Gesture recognition, and prioritizing user gestures to control the videoconferencing application running on each gesture-controlled device 100, may be carried out through some combination of local processing (i.e. at each gesture-controlled device 100) and remote or central processing (i.e. at a central server). In some embodiments, each gesture-controlled device 100 s may send frames captured by the camera of the gesture-controlled device 100 to the central server, which applies a priority ruleset to the collection of frames to prioritize gesture controls collectively. In some embodiments, each gesture-controlled device 100 is configured to prioritize gestures based on a combination of locally captured frames (e.g. frames captured by the camera of the gesture-control device 100) and information received from the other gesture-controlled devices 100 in the system. In some embodiments, the distributed system is an augmented reality (AR) system that includes a gesture-controlled device 100 and multiple cameras (e.g. a camera array positioned around a physical space) and/or multiple displays. In this embodiment, the gesture-controlled device 100 is used to recognize hand gestures in frames captured by the digital camera 102 of the gesture-controlled device 100 and/or the multiple cameras of the system, and the gesture-controlled device uses the recognized hand gesture to control the multiple displays to render information thereon. It will be appreciated that these systems are provided as examples, and that other distributed system are possible.

It will be appreciated that different embodiments may include different combinations of input and output devices in place of, or in addition to, the digital camera 102 and display 104. In the context of a VR or AR system, multiple head-mounted displays may be used instead of a single large shared display 104, with one or more digital cameras 102 used to capture the video used for input as described herein. Feedback information presented to users of such a VR or AR system on each user's respective head-mounted display may be similar to the feedback described herein as being presented on a single shared display 104. In some embodiments, feedback information intended for a single user could be presented only on the targeted user's head-mounted display.

A hand gesture may have different shapes and/or movements. For example, hand gestures may be recognized by the gesture-controlled device 100 as belonging to one of the classes shown in FIGS. 4A, 4B, 5A, 5B, 6A and 6B. While the examples below are described in the context of hand gestures, in some embodiments a gesture may involve body parts other than a hand, such as a face or arm, or may involve physical elements other than a part of a person's body, such as a held object visible to the camera. In this disclosure, the terms "gesture recognition" and "gesture classification" are used interchangeably. When a gesture is recognized, for example by a gesture recognition subsystem 322, the gesture class or type of the recognized gesture is determined.

Hand gestures may be categorized into static or dynamic gestures. A static gesture is a gesture performed by a human hand, in which the human hand persists in the same position, has the same orientation, and the fingers of the human hand have the same configuration for a duration of time (e.g., 1 second) or at least a defined number of consecutive captured video frames (e.g., 100 frames).

In this disclosure, a "dynamic hand gesture" is a gesture performed by the hand 35 during which the hand 35 changes its position in space, the hand 35 changes its orientation in space, or the fingers of the hand 35 change their configuration in space over a duration of time. In this disclosure, dynamic mid-air hand gestures are referred to as dynamic hand gestures for the sake of brevity.

Figure 3:
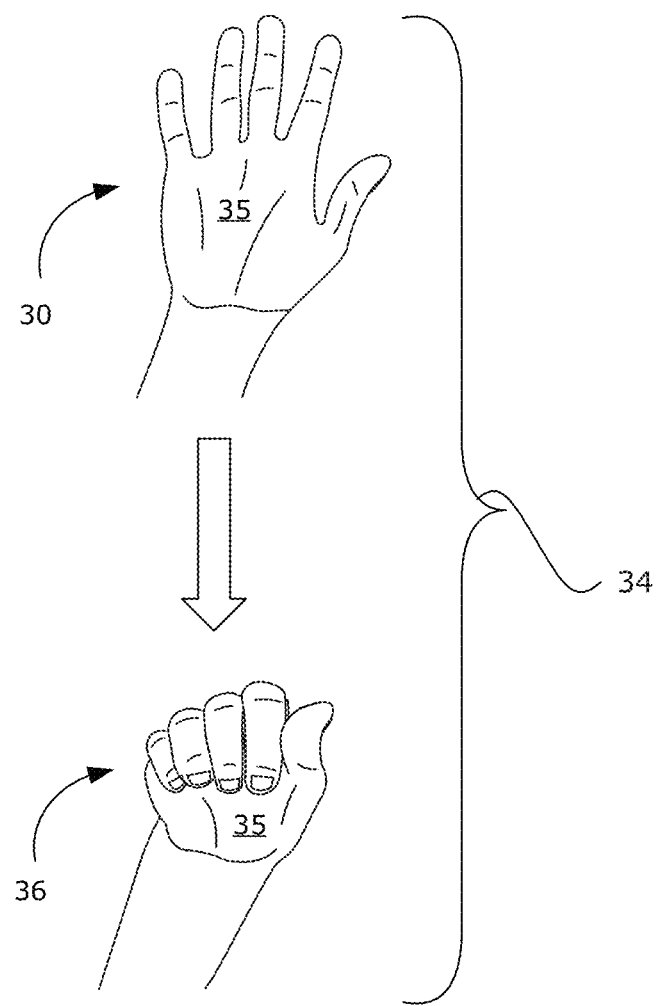
FIG. 3 is a diagram depicting a dynamic mid-air tapping hand gesture.

FIG. 3 illustrates a dynamic mid-air tapping hand gesture 34 in which a hand 35 is switched from an open hand configuration 30 then moving the fingers towards the palm until the hand is in a closed-fist configuration 36, in accordance with example embodiments. In some example embodiments (not shown), a dynamic tapping hand gestures starts with the hand 35 in an open hand configuration, then the fingers are moved until they form an angle with the palm of hand 35. In other example embodiments (not shown), a dynamic tapping hand gesture may be performed by bending a hand, which is an open hand configuration 30, at the wrist so the hand 35 goes from being generally coplanar with the forearm to forming an angle therewith. In yet another embodiment (not shown), a dynamic tapping hand gesture may be formed by bending the forearm at the elbow from a first position in which the forearm is generally vertical (i.e. perpendicular to the floor), to a second position in which the forearm forms an acute angle with the floor or is generally parallel therewith. A dynamic tapping mid-air hand gesture may be used to activate a virtual widget in the form of a push button control as will be described below. A dynamic tapping mid-air hand gesture may also be used to select a radio button in a radio button control, enable a check box in a check box control, or interact with any other suitable virtual widget. In other example embodiments, a dynamic tapping mid-air hand gesture may be used with a slider control to move the sliding element to a particular position by tapping on that position.

Figure 4A:
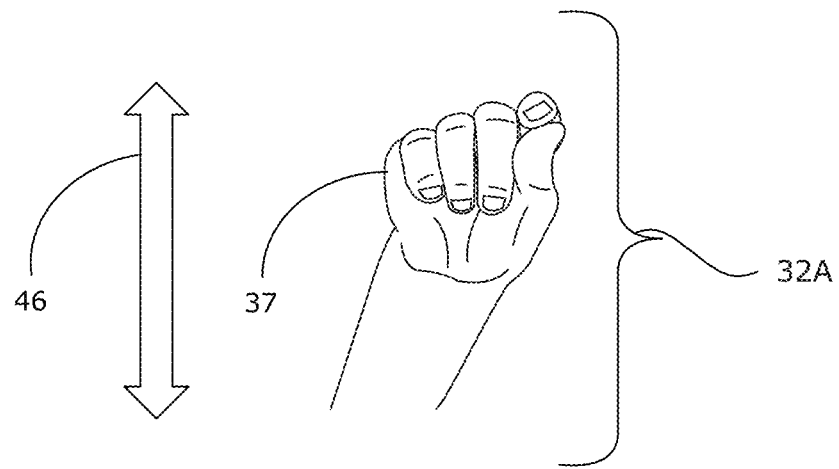
FIG. 4A is a diagram depicting a dynamic vertical dragging mid-air hand gesture.
Figure 4B:
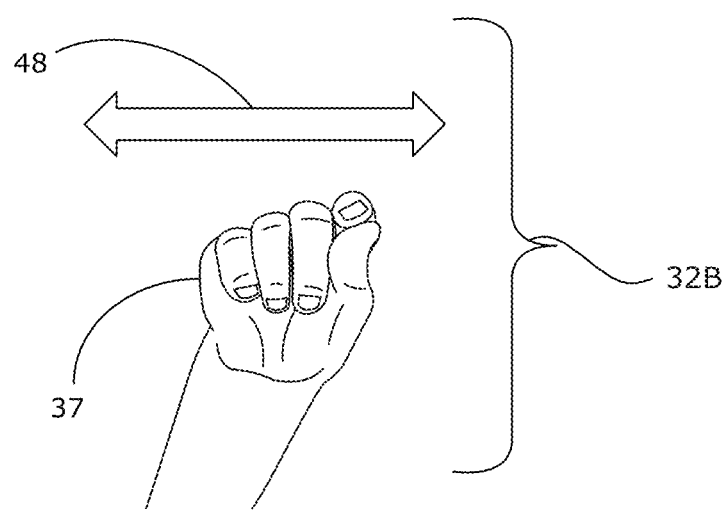
FIG. 4B is a diagram depicting a dynamic horizontal dragging mid-air hand gesture.

FIG. 4A depicts a dynamic vertical dragging mid-air hand gesture 32A in which the hand 35 is in a closed-pinch configuration 37 and is movable up or down in the generally vertical direction indicated by the arrow 46. Similarly, FIG. 4B depicts a dynamic horizontal dragging mid-air hand gesture 32B in which the hand 35 is also in a closed-pinch configuration 37 and is movable to the left or to the right in the generally horizontal direction indicated by the arrow 48. The vertical or horizontal dynamic dragging mid-air hand gestures may be used to control a virtual widget. For example, the dynamic mid-air dragging hand gesture may move a draggable element of a virtual widget such as the sliding element of a slider control in the dragging direction of the hand. The dynamic mid-air dragging hand gesture may also be used to move a thumb of a scrollbar control. The distance by which the hand 35 is moved during the mid-air gestures may be called the dragging distance. In some embodiments, the draggable (or sliding) element of a slider control is moved by a distance proportional to the dragging distance of the mid-air dragging hand gesture.

Figure 5A:
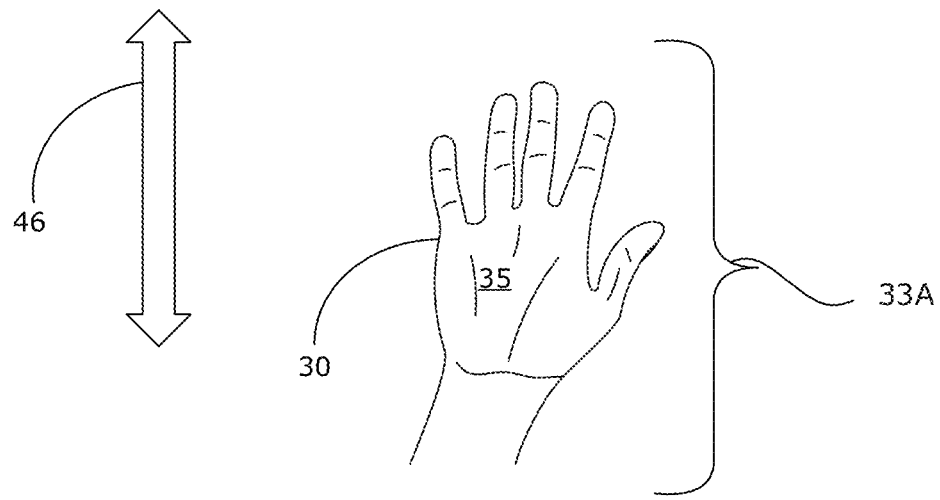
FIG. 5A is a diagram depicting a dynamic vertical hover hand gesture.
Figure 5B:
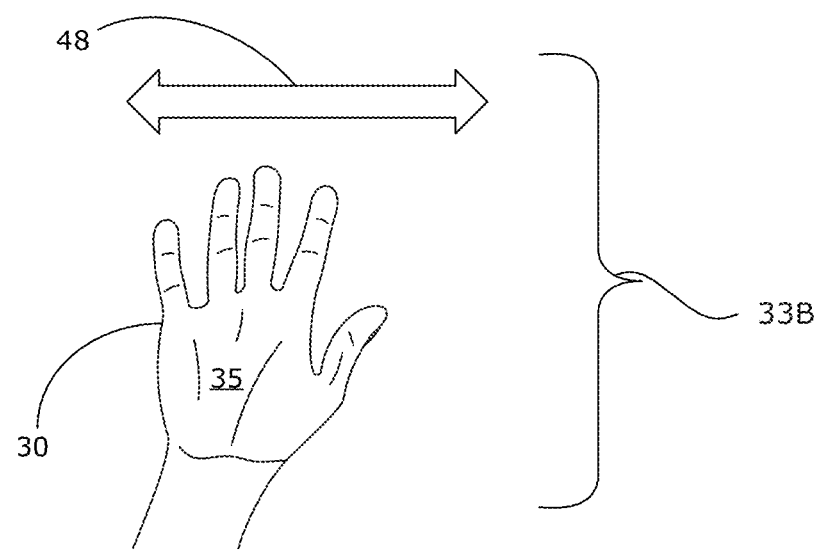
FIG. 5B is a diagram depicting a dynamic horizontal hover mid-air dragging hand gesture.

FIG. 5A depicts a dynamic vertical hover mid-air hand gesture 33A in which the hand 35 is in an open hand gesture and is movable in the generally vertical direction indicated by the arrow 46. FIG. 5B depicts a dynamic horizontal hover mid-air hand gesture 33B in which the hand 35 is also in an open hand configuration 30 and is movable in a generally horizontal direction indicated by the arrow 48. In some example embodiments, the (vertical or horizontal) dynamic hover mid-air hand gesture is used to position the hand in a hover position over a virtual widget to trigger an action. For example, for a button control, the dynamic hover mid-air hand gesture may be used to select the button control and display a callout (or a tool-tip) explaining the function thereof.

Figure 6A:
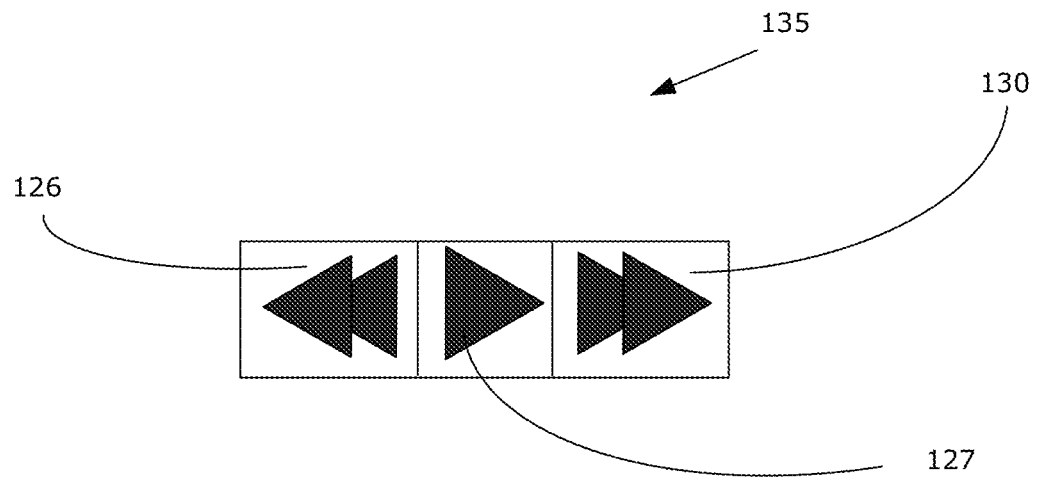
FIG. 6A is a diagram depicting an example media player control featuring a plurality of horizontally arranged virtual widgets.
Figure 6B:
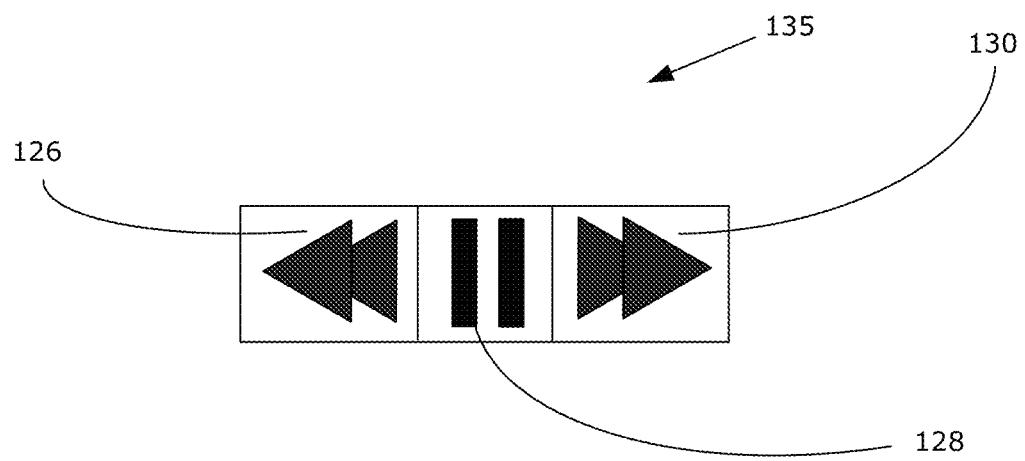
FIG. 6B is a diagram depicting the media player control of FIG. 6A in another configuration.

FIGS. 6A and 6B depict a media player control 135 suitable for use on a gesture-controlled device 100. For example, the display 104 of the gesture-controlled device 100 may display the user interface of a media player application, which in turn comprises a media player control 135. The media player control 135 shown comprises three, horizontally arranged, graphical widgets each in the form of a button control. The first graphical widget of the media player control 135 comprises a playback/pause button control 127. The playback/pause button control is initially configured to be a playback button control 127 which when activated, causes playback of video or audio content on the gesture-controlled device 100. When in playback mode, the playback/paus control button switches to a pause button control 128 which, when activated, pauses the playback of the video or audio content. The second graphical widget of the media player control 135 comprises a fast-forward button control 130, which, when activated, plays audio or video content at a high speed in the forward direction (i.e. towards the end of the video or audio content). The third graphical widget of the media player control 135 comprises a rewind button control 126, which when activated, plays the audio or video content at a high speed in reverse direction (i.e. towards the start of the video or audio content). In some embodiments, a plurality of virtual widgets simulating the functionality of the media control may be created based on the graphical widgets of the media player control 135. In other embodiments, the gesture-controlled device has no display and does not display a media player control 135. In such embodiments, a plurality of virtual graphical widgets are predefined (in software) at particular locations and/or with a particular arrangement. The virtual widgets simulate the functionality of the media player control 135. The virtual widgets may each be activated using dynamic mid-air tapping hand gestures. In the case of graphical widgets displayed on the display 104, the virtual widgets may display a tool-tip associated with any one of buttons 126, 128 and 130 (explaining its function) in response to a hover gesture relative to the corresponding virtual widget.

Figure 7:
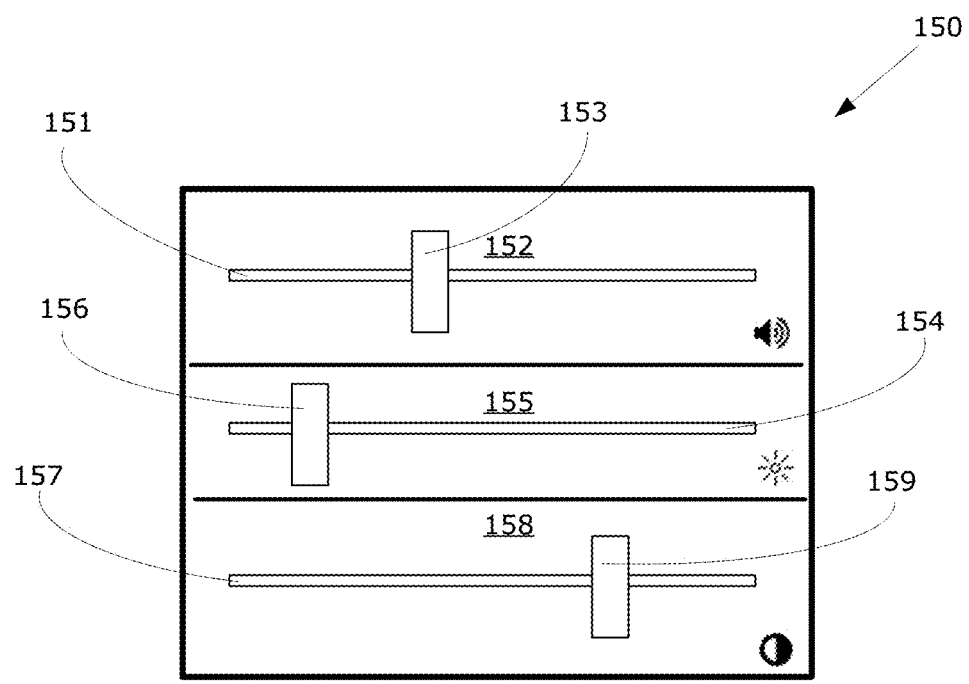
FIG. 7 is a diagram depicting an example audiovisual control featuring a plurality of vertically arranged virtual widgets.

FIG. 7 depicts an example media player audio and video control, hereinafter referred to as an audiovisual control 150. The audiovisual control 150 is comprised of three, vertically arranged, graphical widgets each comprising a slider control. For example, the first graphical widget comprises a volume slider control 152 having a draggable element in the form of a volume control sliding element 153 that is slidable along the volume slider control track 151 for controlling the volume of the audio of a device such as the gesture-controlled device 100. The second graphical widget comprises a brightness slider control 155 having a brightness slider control sliding element 156 that is slidable along a brightness slider control track 154 for controlling the brightness of a display such as the display 104 of the gesture-controlled device 100. The third graphical widget comprises a contrast slider control 158 having a draggable element in the form of a contrast slider control sliding element 159 that is slidable along a contrast slider control track 157 for controlling the contrast of a display such as the display 104. In some embodiments, a plurality of virtual widgets simulating the functionality of the audiovisual control 150 may be created based on the graphical widgets of the audiovisual control 150. In other embodiments, the gesture-controlled device has no display and does not display a media player control 135. In such embodiments, a plurality of virtual graphical widgets are predefined (in software) at particular locations and/or with a particular arrangement. The virtual widgets may be controlled using dynamic mid-air dragging hand gestures, as will be described below.

Figure 10:
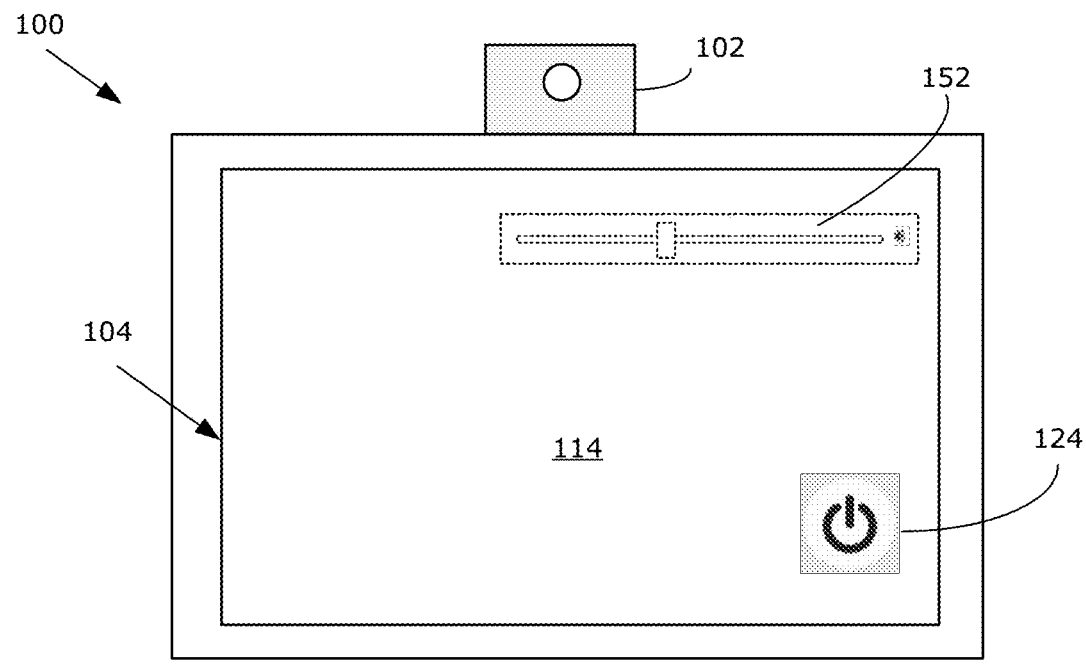
FIG. 10 is a diagram depicting an example of a mid-air interaction with the virtual widget of FIG. 8, in accordance with example embodiments.
Figure 10:
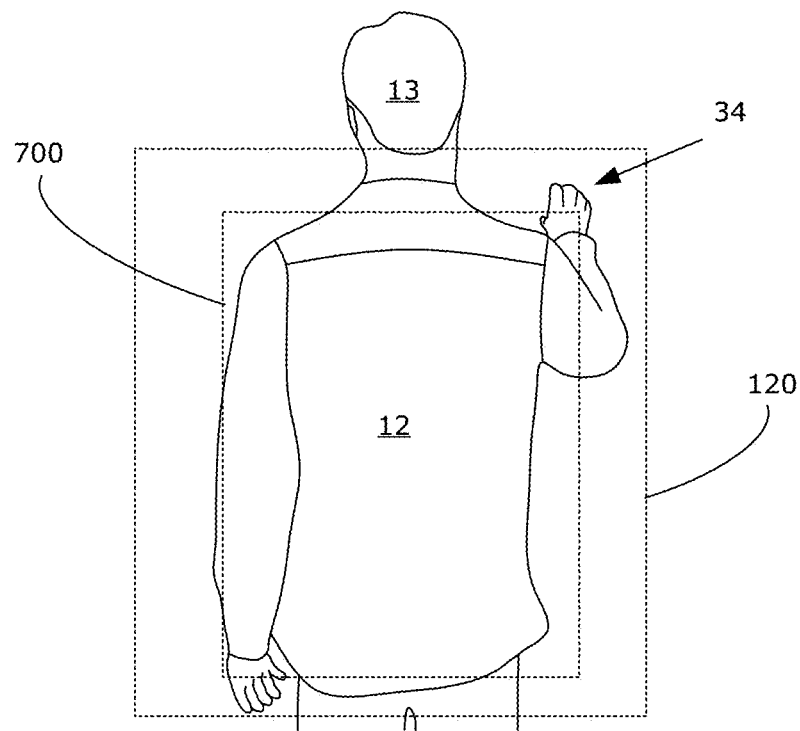

In one example embodiment, in order to utilize the above-described mid-air hand gestures for controlling virtual widgets using around-body interactions, a widget interaction region (WIR) 120 relative to the user's body 12, as shown in FIG. 10, is defined. A dynamic mid-air hand gesture, detected in the WIR relative to the user's body, may be used to control the virtual widget if the mid-air gesture is of a suitable type corresponding to the type of the virtual widget.

Figure 22:
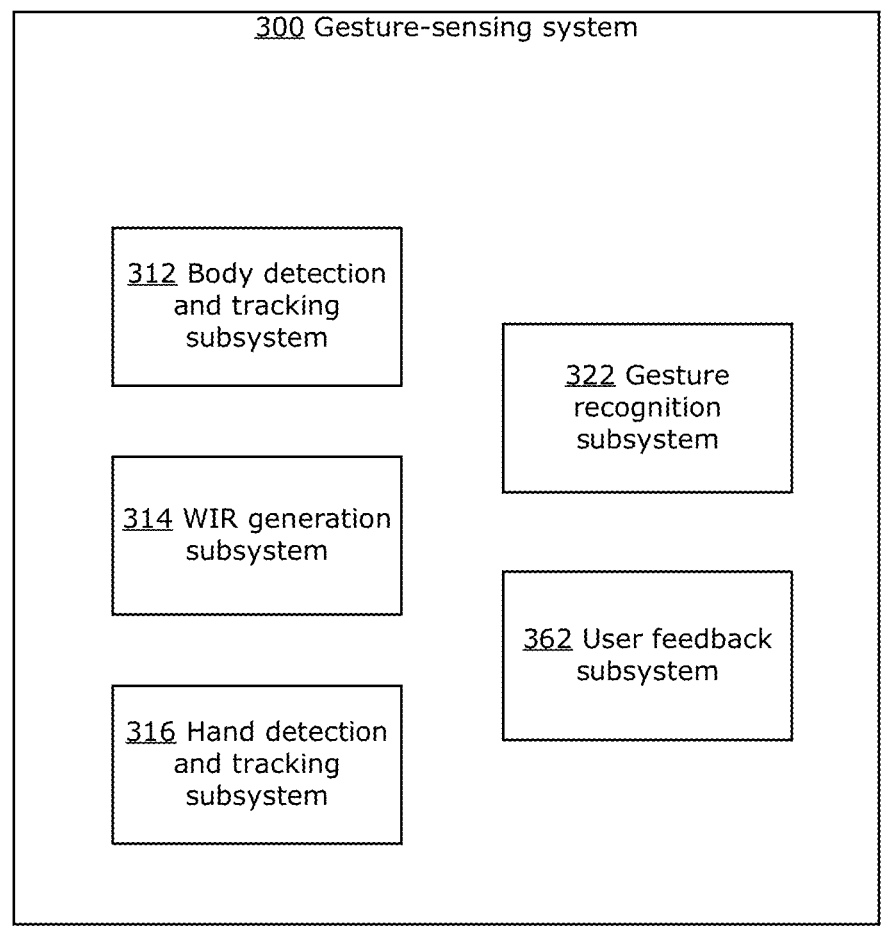
FIG. 22 is a block diagram of a gesture-sensing system, in accordance with example embodiments.

In order to describe the methods for controlling virtual widgets, a description of a gesture-sensing system 300 of the gesture-controlled device 100, is first provided. FIG. 22 is a block diagram illustrating some example subsystems of the gesture-sensing system 300. In this example, the gesture-sensing system 300 may be implemented using a body detection and tracking subsystem, 312, a widget interaction region generation subsystem 314, a hand detection and tracking subsystem 316, a gesture recognition subsystem 322, and a user feedback subsystem 362. In some embodiments, the subsystems 312, 314, 316, 322 and 362 may be implemented as distinct modules. In other embodiments, some or all of the subsystems may be combined into a single module.

A captured frame (i.e. digital image) is received by the gesture-sensing system 300 as an input frame, from the image-capturing device such as the digital camera 102. The body detection and tracking subsystem 312 performs body detection on the input frame. The body detection and tracking subsystem 312 may use any suitable body detection technique to detect the upper body 12 in the input frame and to generate a hand detection region 700, as shown in FIG. 9, for the detected body.

The hand detection region 700 generated for the detected body is used by the WIR generation subsystem 314 to define the interaction region in which a hand gesture may be detected as a valid hand gesture. Gestures performed outside of the interaction region may not be detected and may not be recognized by the gesture-controlled device 100 as a valid hand gesture. In the depicted embodiment, the interaction region is comprised of a single WIR 120.

Figure 8:
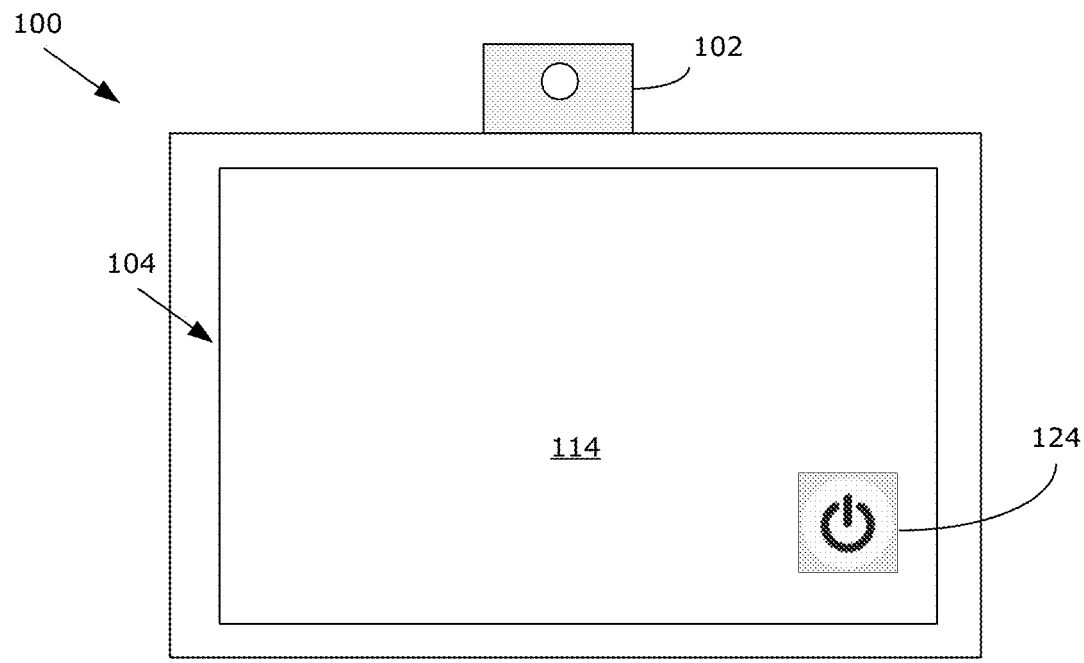
FIG. 8 is a diagram depicting a gesture-controlled device featuring a display on which a virtual graphical is rendered, in accordance with example embodiments of the present disclosure.
Figure 9:
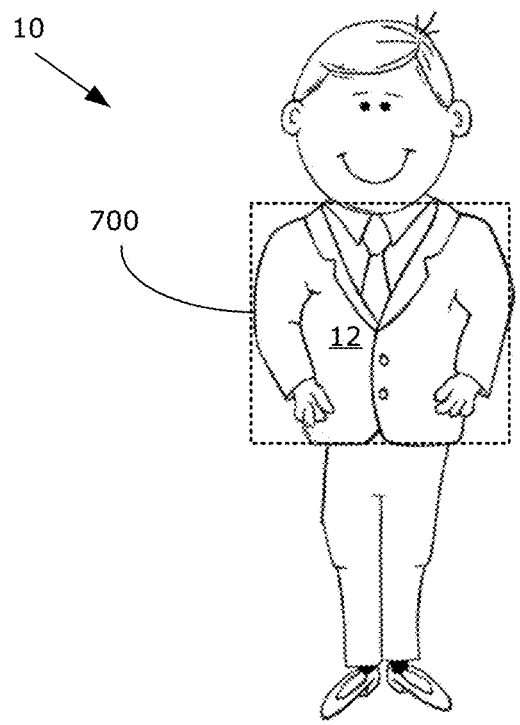
FIG. 9 is a diagram depicting a widget interaction region (WIR) around a user's upper body, in accordance with example embodiments of the present disclosure.

For example, with reference to FIGS. 8-10, there is shown a gesture-controlled device 100 having a display 104 as described before. The display 104 has a viewing area 114 on which there is displayed a virtual widget in the form of a power button control 124. The power button control 124 may be activated in response to a dynamic mid-air tapping hand gesture, such as the one described above with reference to FIG. 3.

FIG. 9 depicts a user 10 having a body bounded by a hand detection region 700 formed around the user's upper body 12. With reference to FIGS. 8 and 9, an image-capturing device, such as the digital camera 102, captured images (video frames) of the body 12 of the user 10. The captured video frames are processed by WIR subsystem 310. Specifically, the captured video games are processed by the body detection and tracking subsystem 312, which detects the upper body 12 and generates a hand detection region 700 around the user's body.

With reference to FIG. 10, once the hand detection region 700 is generated by the body detection and tracking subsystem 312, a widget interaction region (WIR) 120 may be generated by the WIR generation subsystem 314 based on the hand detection region 700. The WIR 120 serves as the interaction region in which mid-air gestures are detected and recognized. For example, the WIR 120 may be the same size and shape as the hand detection region 700. In other examples, the WIR 120 is larger than and encompasses the hand detection region 700. Since the WIR 120 defines the region in which mid-air gestures are processed, then having a WIR 120 that is larger than the hand detection region 700 provides a larger region for mid-air gestures allowing more flexibility. Mid-air gestures carried out outside of the interaction region, i.e. WIR 120, are ignored by the gesture-sensing system 300. In the depicted embodiment, there is a single virtual widget, the power button control 124, on the viewing area 114 of the display 104. The number, arrangement and type of displayed virtual widgets is provided to the gesture-sensing system 300 by either the operating system 220 or the widget controller 500. Since there is only one virtual widget, the power button control 124, then the WIR generation subsystem 314 generates an interaction region comprised of a single WIR 120.

The captured video frames may, in addition to the upper body 12, contain a mid-air hand gesture, such as the dynamic mid-air tapping hand gesture 34 shown. The captured video frames are processed by the hand detection and tracking subsystem 316 to process the portion of the video frames containing the mid-air hand gestures and detect mid-air hand gestures present in the video frames, if any. The detected mid-air hand gestures are then passed on to the gesture recognition subsystem 322. In the depicted embodiment of FIG. 10, the gesture recognition subsystem 322 recognizes that a dynamic tapping hand gesture 34 has been performed. As discussed above, the type of the active virtual widgets is known to one or both of the operating system 220 and the widget controller 500. In the depicted embodiment, the virtual widgets correspond to the displayed controls on the display 104. In other embodiments, there may be no display and the virtual widgets may be pre-defined in software. The gesture to widget mapping subsystem 400 maps the virtual widget, which in the depicted embodiment corresponds to the power button control 124, to the applicable mid-air gesture types. In the case of the power button control 124, both a dynamic mid-air tapping hand gesture 34 and a hover mid-air gesture 33 are applicable types. Accordingly, when the recognized dynamic mid-air tapping hand gesture 34 is passed to the widget controller 500, the action associated with the power button control 124 receiving a dynamic tapping mid-air gesture is carried out, i.e. the gesture-controlled device 100 is powered off. A mid-air gesture, which is not mapped to a virtual widget, is ignored. For example, a dynamic dragging mid-air hand gesture is not mapped to a virtual widget simulating the functionality of the button control type, and is therefore ignored if the only virtual widgets active are the virtual widgets corresponding to (i.e. simulating the functionality of) button controls. Optionally, some user feedback may be provided by the user feedback subsystem 362 based on the recognized mid-air gesture and the virtual widget associated with the mid-air gesture. For example, if the detected mid-air gesture was a hover mid-air gesture 33 over a virtual widget corresponding to the power button control 124, the user feedback subsystem 362 may display a tool tip or a callout with a message such as "Press here to power off the display" above or near the power button control 124. The feedback may be provided in response to detecting a warning condition. In some embodiments, the user feedback subsystem 362 may warn the user that their hand 35 is not within the interaction region. For example, an arrow may be displayed prompting the user to move their hand 35 in a particular direction for proper detection of mid-air hand gestures. The feedback may not always be visual as some systems may not contain a display or may discourage users from looking at displays such as when operating a vehicle or a machine. In such cases, feedback may be provided in the form of an audio message prompting the user to move their hand in a particular direction, for example. In some examples, the feedback may indicate to the user that the performed gesture has not been recognized or is incompatible with the active virtual widgets.

Figure 11:
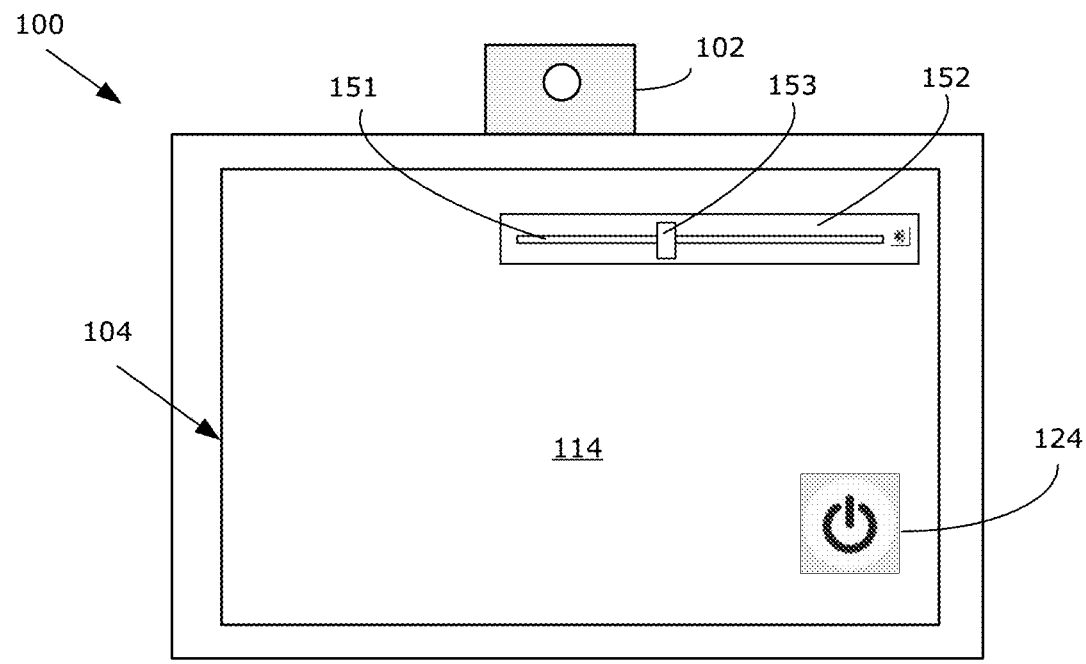
FIG. 11 is a diagram depicting an example of a mid-air interaction with one of a plurality of virtual widgets of different types, in accordance with example embodiments of the present disclosure.
Figure 11:
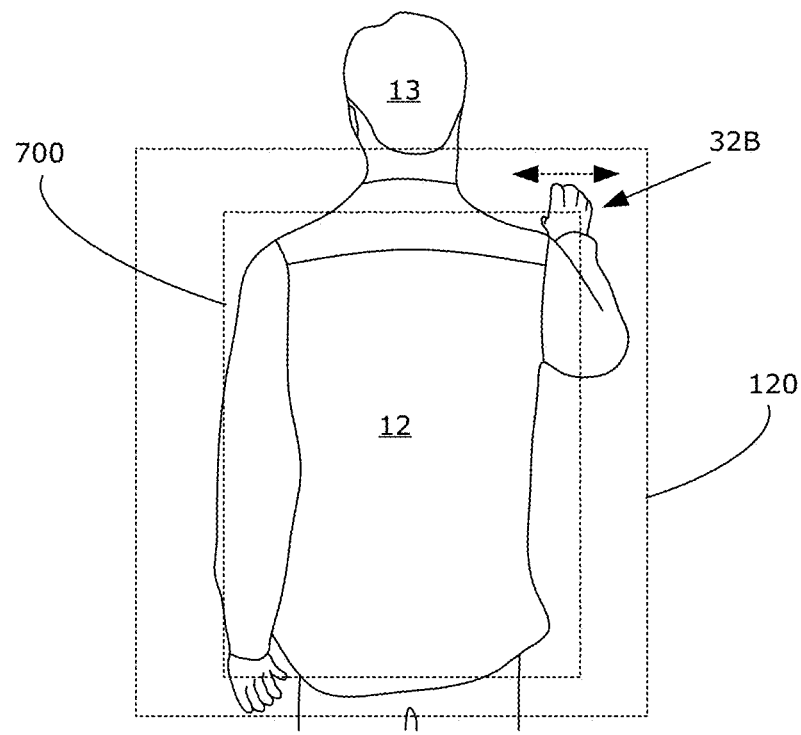

In some example embodiments, if multiple virtual widgets of different types are active and the virtual widgets have mutually exclusive mid-air gestures mapped thereto, then the gesture sensing system 300 can control the virtual widgets based on the type of a recognized mid-air hand gesture. For example, with reference to FIG. 11, the display 104 has, on its viewing area 114, two graphical widgets, a power button control 124 and a volume slider control 152. Each of the displayed graphical widget has a virtual widget corresponding thereto. The virtual widget corresponding to the power button control 124 may only map to a dynamic mid-air tapping hand gesture 34, for example. Similarly, the virtual widget corresponding to the volume slider control 152 may only map to a dynamic horizontal dragging mid-air hand gesture 32B. In this example, each of the virtual widgets may be controlled within the single WIR 120 based on the recognized mid-air gesture type. Specifically, if a dynamic horizontal dragging mid-air hand gesture 32B, as shown in FIG. 11, is recognized by the gesture recognition subsystem 322, the gesture-to-widget mapping subsystem 400 determines that the horizontal dragging mid-air hand gesture 32B applies to the virtual widget corresponding to the volume slider control 152. The widget controller 500 executes the action associated with the volume slider control 152. For example, if a horizontal dragging mid-air hand gesture 32B is recognized towards the right direction, then the widget controller 500 causes the action executed with increasing the volume to be executed. Optionally, the user feedback subsystem may also provide user feedback based on the virtual widget and the recognized mid-air gesture. In the depicted embodiment, the user feedback subsystem 362 causes the volume slider control sliding element 153 to be moved to the right along the volume slider control track 151 in response to recognizing the horizontal dragging mid-air gesture towards the right direction.

When multiple graphical widgets, of the same type, are displayed on a display 104, the gesture-sensing system employs a number of methods to map the recognized mid-air hand gestures to the respective virtual widgets corresponding to the graphical widgets. In one example embodiment, mapping the mid-air hand gestures to the respective virtual widgets is based on a WIR relative to which the mid-air gesture is performed. For example, with reference to FIGS. 12-13, the gesture-controlled device 100 has a display 104 on the viewing area 114 thereof there is shown the media player control 135 described earlier with reference to FIGS. 6A-6B. The media player control is comprised of a plurality of graphical widgets of the same type (button control). Accordingly, a plurality of virtual widgets are created each corresponding to a graphical widget of the media player control 135. In the depicted embodiment, three virtual widgets are created corresponding to the buttons 126, 127 and 130 of the media player control 135. The virtual widgets accept the same type of mid-air gestures. For example, the buttons 126, 127 and 128 are normally activated by being pressed or tapped. Since the virtual widgets simulate the functionality of the buttons, the virtual widgets all respond to dynamic mid-air tapping hand gestures 34, for example. Accordingly, the virtual widgets corresponding to the buttons 126, 127 and 128 To control or activate the intended virtual widget, the WIR surrounding the user's body hand detection region 700 is divided into a plurality of WIRs. In the depicted embodiment, the virtual widgets correspond to graphical widgets displayed on the display 104. In this case, the operating system 220 or the widget controller 500 can provide information about the number, type and arrangement (locations) of graphical widgets currently displayed on the display 104. The information may be stored in memory or in a database to be later used by other modules including the WIR generation subsystem 314 to generate the plurality of WIRs corresponding to the virtual widgets. In other embodiments, there may be no display showing any graphical widgets. The virtual widgets may be pre-defined in software. In this case, the software, which defines the virtual widgets already, knows their location and/or arrangements and does not need to obtain that information from the operating system 220 or the widget controller 500.

The image-capturing device, such as the digital camera 102, captures a video comprising a plurality of frames of the user 10, including the user's upper body 12 as discussed above. The captured frames are passed to the gesture-sensing system 300 and more particularly, the WIR subsystem 310. The body detection and tracking subsystem 312 generates the hand detection region 700 around the user's body. The WIR generation subsystem 314 generates the WIR 120 around the hand detection region 700. The WIR generation subsystem 314 also determines the number and distribution of virtual widgets. As indicated above, the number, location and arrangement of the virtual widgets may be known if the virtual widgets are predefined. Alternatively, if the virtual widgets correspond to graphical widgets displayed in the viewing area 114 of the display 104, then that information was provided by the operating system 220 and stored earlier in memory or in a database as indicated above. In the depicted embodiment, the virtual widgets are horizontally arranged. Accordingly, the WIR generation subsystem 314 subdivides the WIR 120 into three horizontally arranged WIRs 142, 144 and 146.

Figure 14:
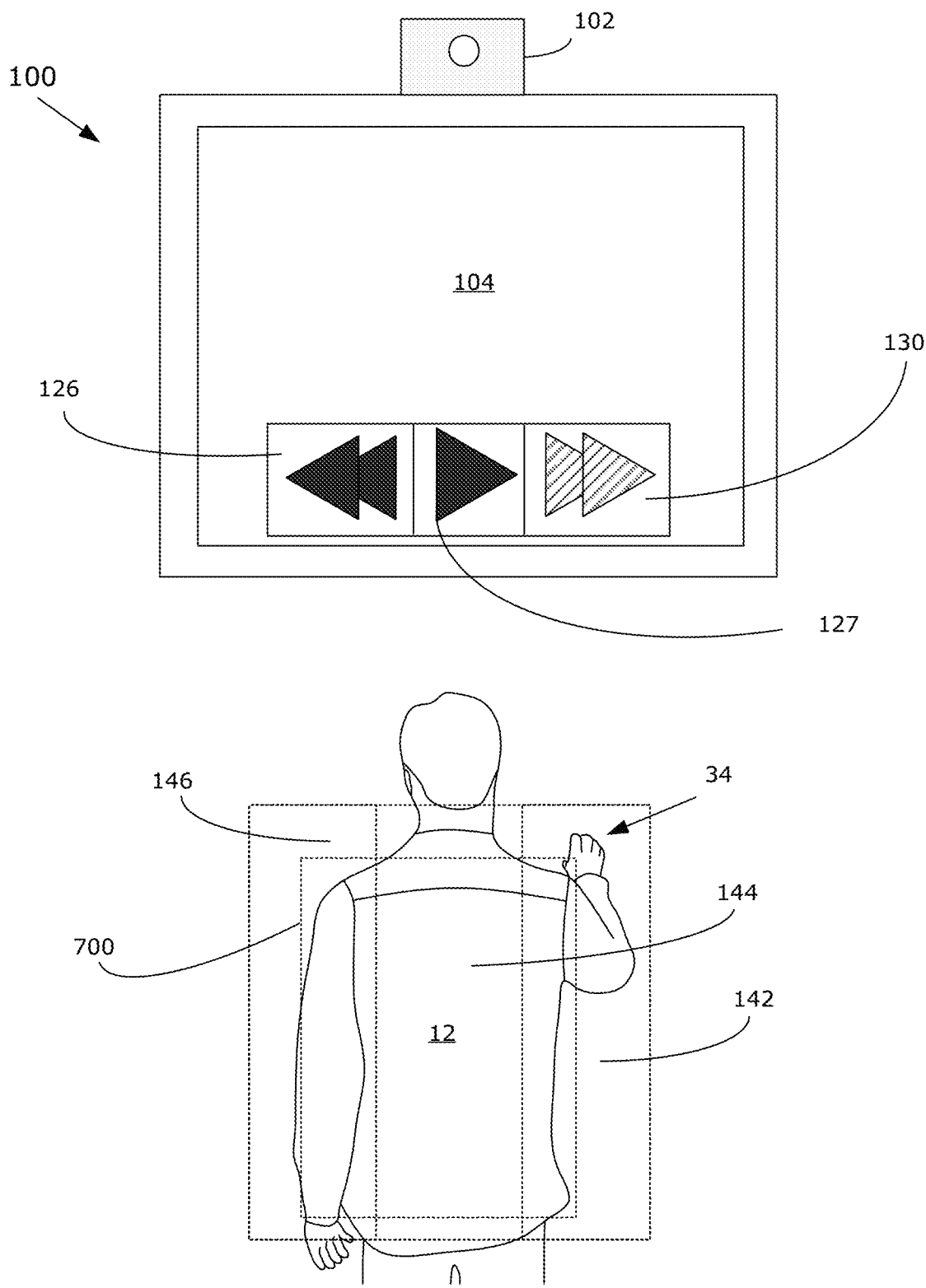
FIG. 14 is a diagram depicting controlling a virtual widget of the media application control of FIGS. 6A-6B, using a dynamic mid-air hand gesture, in accordance with example embodiments of the present disclosure.

With reference to FIG. 14, for example, the user 10 is performing a dynamic mid-air tapping hand gesture 34 in the right WIR 142. The user's hand is in the captured video frames, which are captured by the image-capturing device, such as the digital camera 102 and passed to the hand detection and tracking subsystem 316. The hand detection and tracking subsystem 316 detects the portion of the video frames containing the user's hand performing the mid-air gesture. In some embodiments, the WIR generation subsystem 314 provides the boundaries of the generated WIRs to the hand detection and tracking subsystem 316. Accordingly, the hand detection and tracking subsystem 316 can determine the respective WIR in which the hand is performing a gesture. For example, the hand detection and tracking subsystem 316 may compare the location of the hand in the video frames with the boundaries of the generated WIRs (142, 144 and 146). Based on the result of the comparison, the hand detection and tracking subsystem 316 can determine the WIR in which the hand is performing the gesture. For the depicted embodiment, the hand is in the right WIR 142. The video frames containing the user's hand performing the gesture are passed to the gesture recognition subsystem 322. The gesture recognition subsystem 322 recognizes the type of gesture in the captured video frames. For example, in the depicted embodiment the recognized mid-air gesture is a dynamic mid-air tapping hand gesture 34. The gesture type and an identifier of the respective WIR in which the mid-air gesture was performed are passed to the gesture to widget mapping subsystem 400. The gesture to widget mapping subsystem 400 first checks whether the recognized mid-air gesture maps to an active virtual widget. An active virtual widget is one which currently accepts mid-air gestures. For devices which display graphical widgets, an active virtual widget corresponds to a graphical widget that is currently displayed on the display 104. For devices which do not contain displays or show graphical widgets, an active virtual widget is determined by software as a virtual widget which currently responds to a mid-air gesture by a user. As discussed earlier, the number, type and location of virtual widgets have been determined and saved either in memory or in a database. The gesture to widget mapping subsystem 400 can access that information and compare the recognized mid-air gesture type with the type of gestures associated with the active virtual widgets. If the active virtual widgets do not correspond to the recognized mid-air gesture, then the recognized mid-air gesture is ignored. For example, a dynamic mid-air dragging hand gesture 32 performed in the right WIR 142 may be ignored by the gesture to widget mapping subsystem 400 since the virtual widget in the right WIR 142 corresponds to a fast forward button 130, which responds only to a dynamic mid-air tapping hand gesture 34. The gesture-controlled device 100 captures new video frames, containing new gestures, which can be processed as, described above. If the active virtual widgets correspond to the recognized mid-air gesture, the virtual widget that responds to the recognized mid-air gesture is determined based on the WIR in which it is recognized. In the depicted embodiment, the gesture to widget mapping subsystem 400 determines that a tapping mid-air gesture in the right WIR maps to the virtual widget corresponding to the graphical widget displayed to the right of the display 104 (i.e. button control 130). Specifically, the gesture to widget mapping subsystem 400 then maps the dynamic mid-air tapping hand gesture 34 to the virtual widget corresponding to the fast-forward button control 130, which is the virtual widget in the right WIR 142. The gesture to widget mapping subsystem 400 passes the recognized mid-air gesture type along with an identifier for the corresponding virtual widget to the widget controller 500. For the depicted embodiment, the gesture to widget mapping subsystem 400 sends an indication that a dynamic mid-air tapping hand gesture 34 was recognized along with an identifier for virtual widget corresponding to the fast-forward button control 130 to the widget controller 500. The widget controller 500 performs the action associated with the activation of the fast-forward button control 130 in response to the received gesture type and virtual widget identifier. Optionally, the user feedback subsystem 362 may provide feedback based on the recognized mid-air gesture and the corresponding virtual widget. For example, in the depicted embodiment, the user feedback subsystem 362 may cause the fast-forward button control 130 to be highlighted to indicate that the fast forward function is currently active. This is depicted in FIG. 14 by having the fast-forward button control 130 in hashed pattern. A subsequent mid-air gesture recognized and detected in another WIR may trigger another action on a respective virtual widget. For example, a dynamic mid-air tapping hand gesture 34 detected and recognized in the middle WIR 144 corresponds to the middle virtual widget, which corresponds to (i.e. simulates the functionality of) the playback button control 127. Accordingly, widget controller 500 causes the media player application to switch from fast-forward mode to play mode, in response to the dynamic mid-air tapping hand gesture 34 in the middle WIR 144. Since the three virtual widgets corresponding to the buttons 126, 127 and 130 are horizontally arranged, the three WIRs corresponding to the user's upper body 12 are also horizontally arranged. In another embodiment, the virtual widgets may correspond to button controls but arranged vertically on the viewing area 114 of the display 104. In yet another embodiment, the gesture-controlled device does not have a display and there are no graphical widgets displayed, but the gesture-controlled device has created three vertically arranged virtual widgets. In both embodiments, the WIR 120 formed around the user's upper body 12 is divided into three vertically arranged WIRs each corresponding to a respective virtual widget (which simulates the functionality of a button control).

Figure 15:
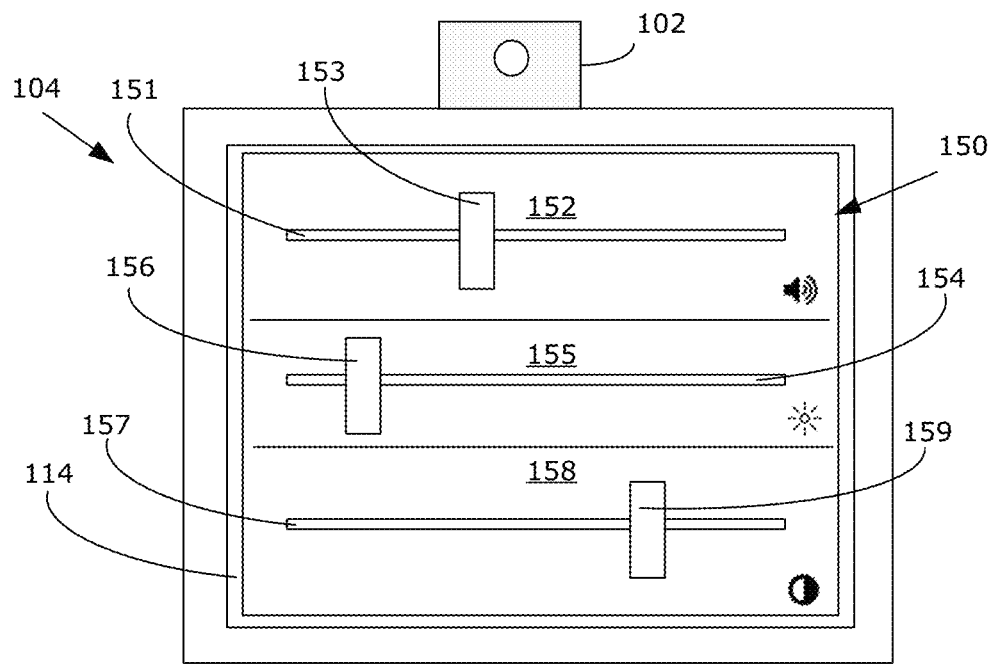
FIG. 15 is a diagram depicting the gesture-controlled device of FIG. 8 having the audiovisual control of FIG. 7 displayed on the display thereof, in accordance with example embodiments of the present disclosure.
Figure 16:
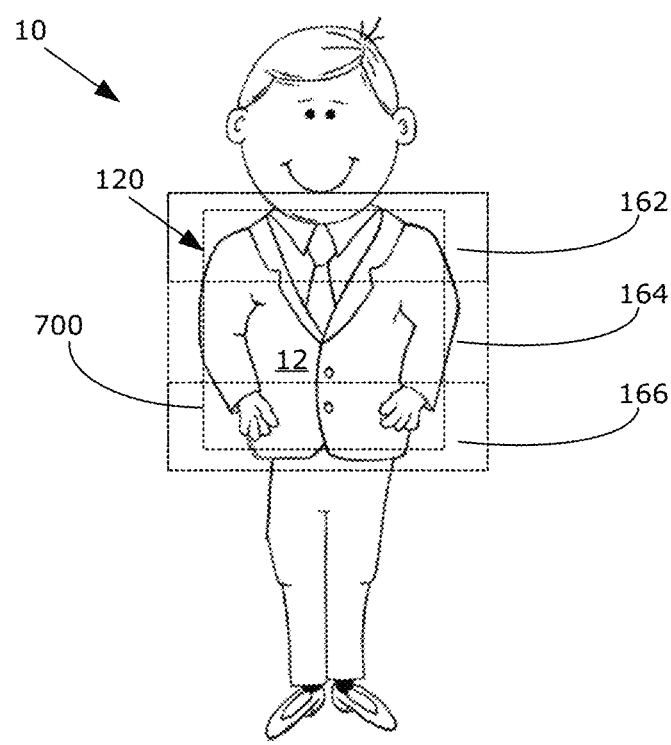
FIG. 16 is a diagram depicting a plurality of vertically arranged WIRs around a user's upper body, in accordance with example embodiments of the present disclosure.

Virtual widgets simulating the functionality of button controls may be activated by dynamic tapping mid-air hand gestures. Other types of virtual widgets respond to different types of dynamic mid-air hand gestures. For example, in another embodiment, shown in FIGS. 15-17, the audiovisual control 150 of FIG. 7 is displayed on viewing area 114 of the display 104 of the gesture-controlled device 100, as shown in FIG. 15. In this embodiment, the audiovisual control 150 includes three graphical widgets in the form of slider controls, namely slider controls 152, 155 and 158, which are vertically arranged. The number of the graphical widgets and their arrangement on the viewing area is provided either by the operating system 220 or by the widget controller 500 to the gesture-sensing system 300. The number and arrangement of the graphical widgets may be stored in memory or in a database table for later use by various components of the gesture-sensing system 300. In the depicted embodiment, the widget controller 500 creates virtual widgets corresponding to the graphical widgets. In other embodiments, the gesture-controlled device may not have a display or show any graphical widgets. In such embodiments, the virtual widgets are pre-defined in software. With reference to FIG. 16, a user 10 is shown having an upper body 12. A hand detection region 700 is formed around the upper body, and a WIR 120 is formed around the hand detection region 700. The WIR 120 is subdivided into vertically arranged WIRs 162, 164 and 166 corresponding to the virtual widgets, created by the widget controller 500, to correspond to the slider controls 152, 155 and 158. This is described in detail with reference to FIG. 17 below.

Figure 17:
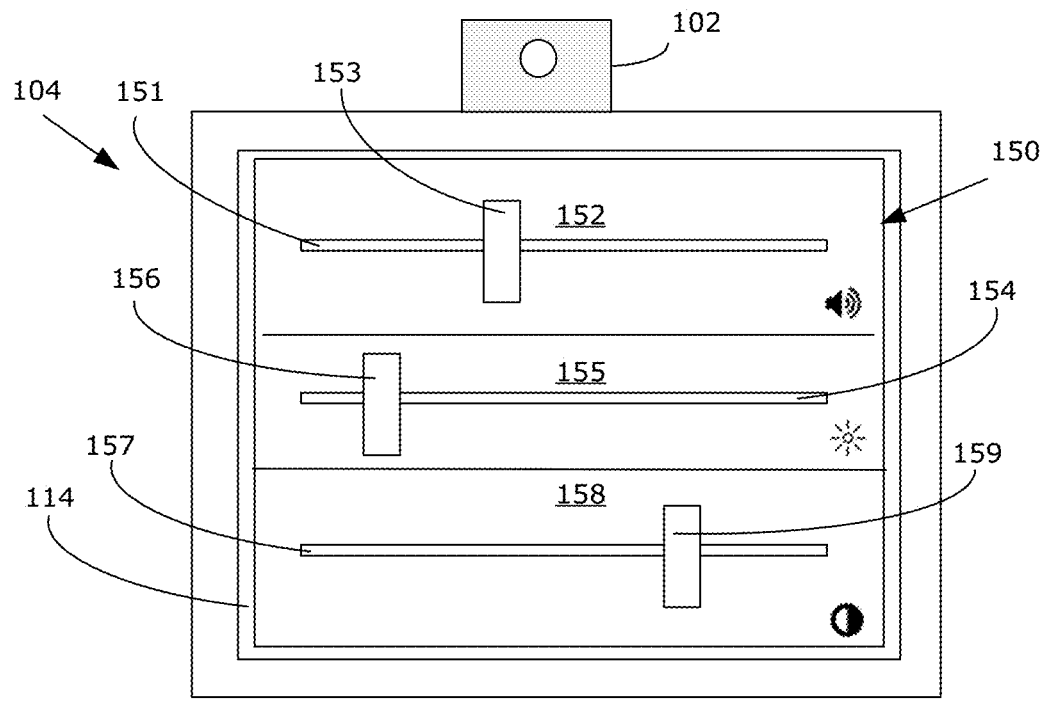
FIG. 17 is a diagram depicting controlling a virtual widget of the audiovisual control of FIG. 15 using a dynamic mid-air gesture, in accordance with example embodiments of the present disclosure.
Figure 17:
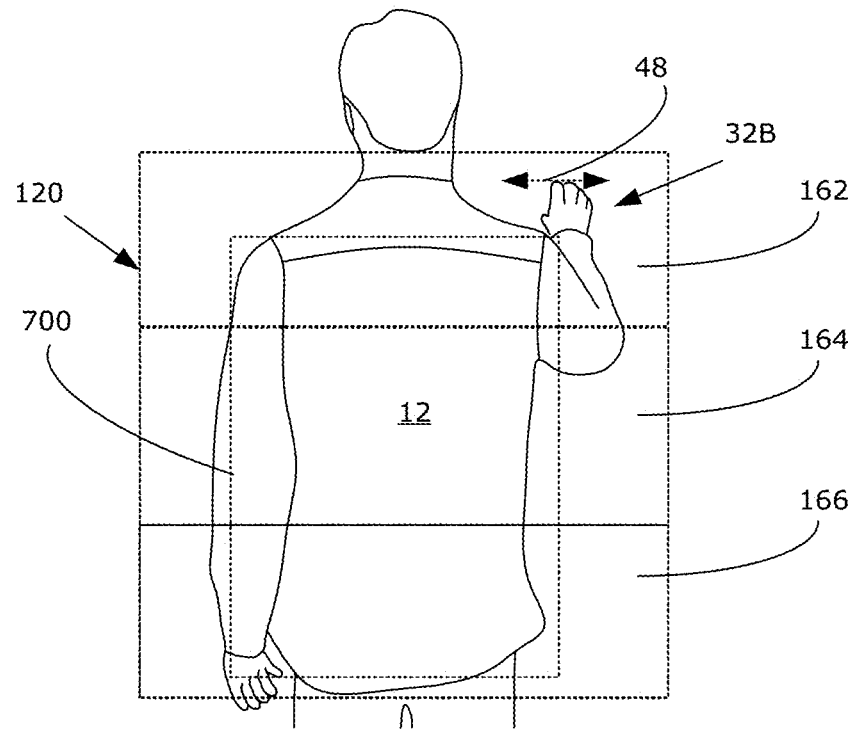

FIG. 17 depicts the user 10 performing a mid-air hand gesture in front of the display 104. An image-capturing device, such as the digital camera 102 captures video frames of the user 10 including the user's upper body 12 and hand 35. The captured video frames are passed on to the gesture-sensing system 300. The body detection and tracking subsystem detects the user's upper body 12 and forms a hand detection region 700 around the upper body 12 in the video frames as described above. The operating system 220 or the widget controller 500 provide the number, type and arrangement of the graphical widgets displayed on the display 104 to the gesture sensing system 300 and to the widget controller 500, passing the information in memory or in a database table entry, for example. The widget controller 500 creates a plurality of virtual widgets corresponding to (i.e. simulating the functionality of) the displayed graphical widgets. The WIR generation subsystem 314 generates a WIR 120 around the hand detection region 700 and then subdivides the WIR 120 based on the number and arrangement of the virtual widgets. In other words, the WIR generation subsystem 314 generates a plurality of WIRs equal in number and having the same arrangement as the virtual widgets. In the depicted embodiment, the gesture-sensing system 300 receives information of three vertically arranged virtual widgets, created by the widget controller 500 to correspond to the displayed graphical widgets. Accordingly, the WIR generation subsystem 314 subdivides the WIR 120 into three vertically arranged WIRs 162, 164 and 166. The WIRs 162, 164 and 166 correspond to the three vertically arranged virtual widgets, which in turn correspond to the slider controls 152, 155 and 158. The hand detection and tracking subsystem 316 detects the user's hand performing the mid-air gesture in the video frames. The hand tracking and detection subsystem may use location of the user's hand and the boundaries of the three WIRs 162, 164 and 166 to determine in which WIR the mid-air gesture is performed. The video frames containing the mid-air hand gesture are then passed to the gesture recognition subsystem 322 to recognize the mid-air gesture and identify its type. The gesture recognition subsystem 322 recognizes the mid-air gesture as a dynamic horizontal dragging mid-air hand gesture 32B. The recognized mid-air gesture type and the WIR in which it is performed are provided to the gesture to widget mapping subsystem 400. The gesture to widget mapping subsystem 400 checks if the recognized mid-air gesture corresponds to any of the virtual widgets, otherwise it is ignored. The gesture to widget mapping subsystem 400 then identifies the virtual widget that should be controlled by the recognized mid-air gesture based on the WIR in which the mid-air gesture was performed. In the depicted embodiment, the dynamic horizontal dragging mid-air hand gesture 32B was performed in the top WIR 162 and therefore the gesture to widget mapping subsystem 400 identifies the virtual widget corresponding to the slider control 152 as the virtual widget to be controlled. The identifier of the virtual widget and the type and parameters of the mid-air gesture are provided, by the widget mapping subsystem 400 to the widget controller 500. In the depicted embodiment, the virtual widget corresponds to the slider control 152), and the recognized gesture is a dynamic horizontal dragging mid-air gesture in the right direction. In response, the widget controller moves the sliding element 153 along the slider volume control track 151 in the right direction by a distance corresponding to the distance moved by the hand in the horizontal dragging mid-air hand gesture 32B performed by the user 10. Since the slider control 152 is a volume slider control, the recognized horizontal dragging mid-air gesture in the right direction causes the volume on the gesture-controlled device 100 containing display 104 to go up.

Conversely, if the dynamic mid-air dragging hand gesture 32 is in the left direction, the volume slider control sliding element 153 moves to the left along the volume slider control track 151 thus decreasing the volume.

The embodiment of FIG. 17 defines virtual widgets based on graphical widgets displayed on a display 104 of the gesture-controlled device 100. In another embodiment, the virtual widgets may be pre-defined in software to be vertically arranged and no corresponding graphical widgets are displayed. In this case, the user is told via documentation or audio messages that the gesture-controlled device has three vertically arranged virtual widgets, which respond to horizontal mid-air dragging hand gestures. Accordingly, the virtual widgets may be used to simulate the functionality of slider controls even if graphical devices are not shown on a display.

The virtual widgets may respond to more than one gesture. For example, while the virtual widgets corresponding to the slider controls 152, 155, 158 respond to dynamic horizontal dragging mid-air hand gestures 32B, they may each also respond to a dynamic tapping gesture. For example, if a dynamic mid-air tapping hand gesture 34 is recognized by the gesture recognition subsystem 322 in the middle WIR 164, the gesture to widget mapping subsystem recognizes it as a valid gesture for the virtual widget corresponding to the brightness slider control 155. For example, if the dynamic mid-air tapping hand gesture 34 is near the right end of the middle WIR 164, then the widget controller 500 moves the brightness slider control slider element 156 to the right by a distance corresponding to the location of the dynamic tap gesture within the WIR 164. As a result, the brightness of the display 104 is increased by an amount corresponding to the distance by which the widget controller 500 has moved the brightness slider control slider element 156. Accordingly, a virtual widget may be controlled by more than one mid-air hand gesture and the location of the hand gesture within a WIR affects the way the virtual widget is controlled.

Figure 18A:
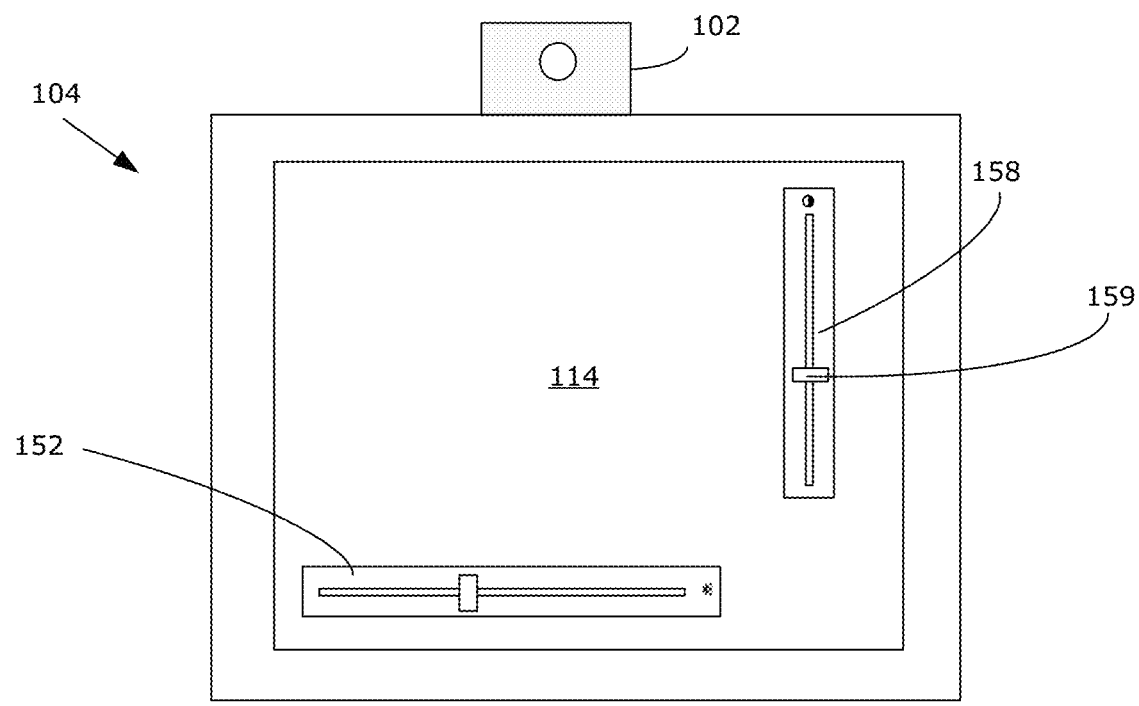
FIG. 18A is a diagram depicting controlling a virtual widget in the form of a slider based on its location on a display of a gesture-controlled device, in accordance with example embodiments of the present disclosure.
Figure 18A:
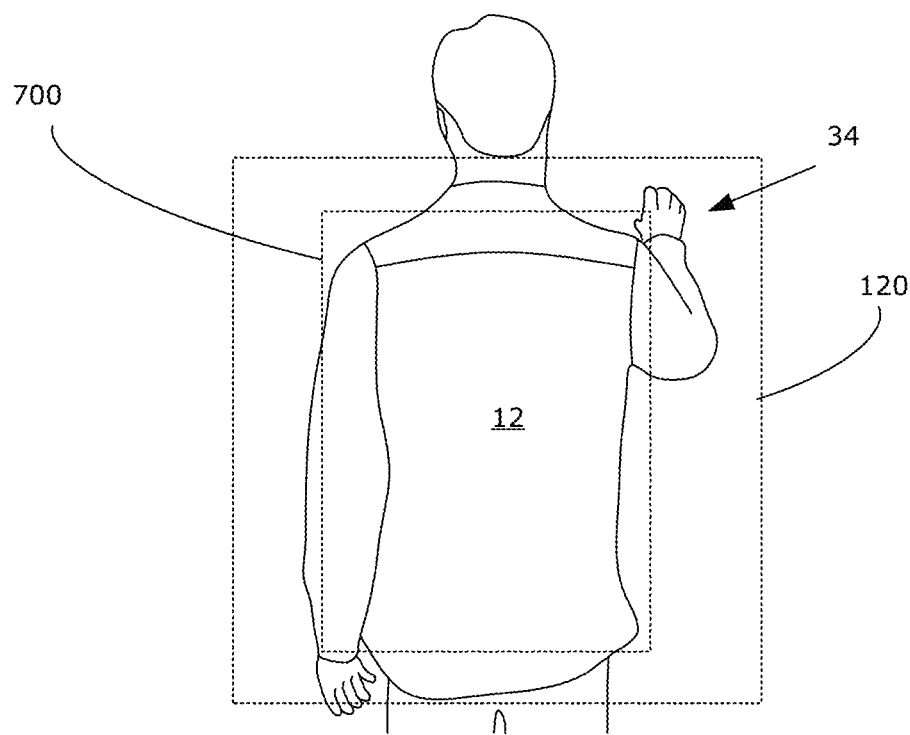

In other example embodiments, virtual widgets of the same type or of different types may be controlled based on the locations of recognized mid-air hand gestures within a WIR. For example, with reference to FIG. 18A, there is shown a vertically oriented contrast slider control 158 displayed along the right edge of the viewing area 114 of the display 104. There is also shown a horizontally oriented volume slider control 152 near the bottom edge of the display 104. As discussed above, with reference to FIG. 10, virtual widgets, which correspond to different mid-air gestures, may be and controlled since they map to different types of mid-air gestures. For example, in FIG. 18A, a vertically oriented virtual widget corresponding to the vertically oriented contrast slider control 158 may be controlled by a vertical dragging mid-air gesture. Similarly, a horizontally oriented virtual widget corresponding to the horizontally oriented volume slider control 152 may be controlled by a horizontal dragging mid-air gesture. In some example embodiments, as discussed above, some virtual widgets may be controlled by more than one type of mid-air gesture. As an example, the virtual widget which corresponds to (i.e. simulates the functionality of) the volume slider control 152 may respond to a tapping mid-air gesture as discussed above. In this embodiment, the location of the recognized mid-air gesture determines the virtual widget being controlled. As an example, with reference to FIG. 18A, the operating system 220 or the widget controller 500 provide the type and location of each of the graphical widgets, such as slider controls 152 and 158 to the gesture-sensing system 300 and the widget controller 500. The widget controller then creates two virtual widgets having similar location (within the WIR 120) and orientation as the slider controls 152 and 158 do within the viewing area 114 of the display 104. For example, contrast slider control 158 is rectangular and may be defined by the X-Y coordinates of two diagonally opposing vertices, wherein the coordinates are relative to the borders of the viewing area 114 of the display 104. A corresponding virtual widget may be created, by the widget controller, at a corresponding location within the WIR 120, applying any necessary scaling. The body detection and tracking subsystem generates the hand detection region 700 around the upper body 12 as before. The WIR generation subsystem 314 generates one WIR 120. A tapping hand gesture is recognized by the gesture recognition subsystem 322. The gesture type and location, determined by the gesture recognition subsystem 322 are provided to the gesture to widget mapping subsystem 400. The location of the gesture within the WIR 120 is mapped by the gesture to widget mapping subsystem 400 to a location in the WIR 120. The gesture to widget mapping subsystem 400 then determines the virtual widget occupying (or overlapping with) the location of the gesture within the WIR 120. Upon identifying the virtual widget, which is to be controlled by the recognized mid-air gesture, the widget controller 500 checks whether the virtual widget is compatible with the recognized mid-air gesture and if so, controls the virtual widget accordingly. For example, in the depicted embodiment a dynamic mid-air tapping hand gesture 34 is detected in the top right corner of the WIR 120. The location of the dynamic mid-air tapping hand gesture 34 may be denoted by an X-Y coordinate or a range of X-Y coordinates relative to the borders of the interaction region, i.e. the WIR 120. The gesture to widget mapping subsystem 400 searches, using the information provided by the operating system 220 or the widget controller 500, for a virtual widget at or near the top right corner of the WIR 120. The gesture to widget mapping system then checks whether the mid-air gesture falls within the borders of the virtual widget. In the depicted embodiment, the dynamic tapping mid-air gesture 34 would overlap with at least a portion of virtual widget corresponding to the contrast slider control 158. The gesture to widget mapping subsystem 400 also checks whether the virtual widget corresponding to the location of the mid-air gesture is compatible with the gesture type of the recognized mid-air gesture. If so, the gesture to widget mapping subsystem 400 then concludes that the contrast slider control 158 is graphical widget corresponding to the virtual widget, which should respond to the dynamic mid-air tapping hand gesture 34. The gesture to widget mapping subsystem 400 then provides the identity of the virtual widget (and accordingly its corresponding graphical widget, i.e. contrast slider control 158) to the widget controller 500. The widget controller may cause the contrast slider control sliding element 159 to be moved up by a discrete distance dependent on the location of the tapping mid-air gesture 34. For example, if the tapping mid-air gesture 34 is near the top edge of the WIR 120, then the contrast slider control sliding element 159 is moved up to the topmost location along the contrast slider control track 157. As a result, the contrast of the display 104 is set to its maximum value.

Figure 18B:
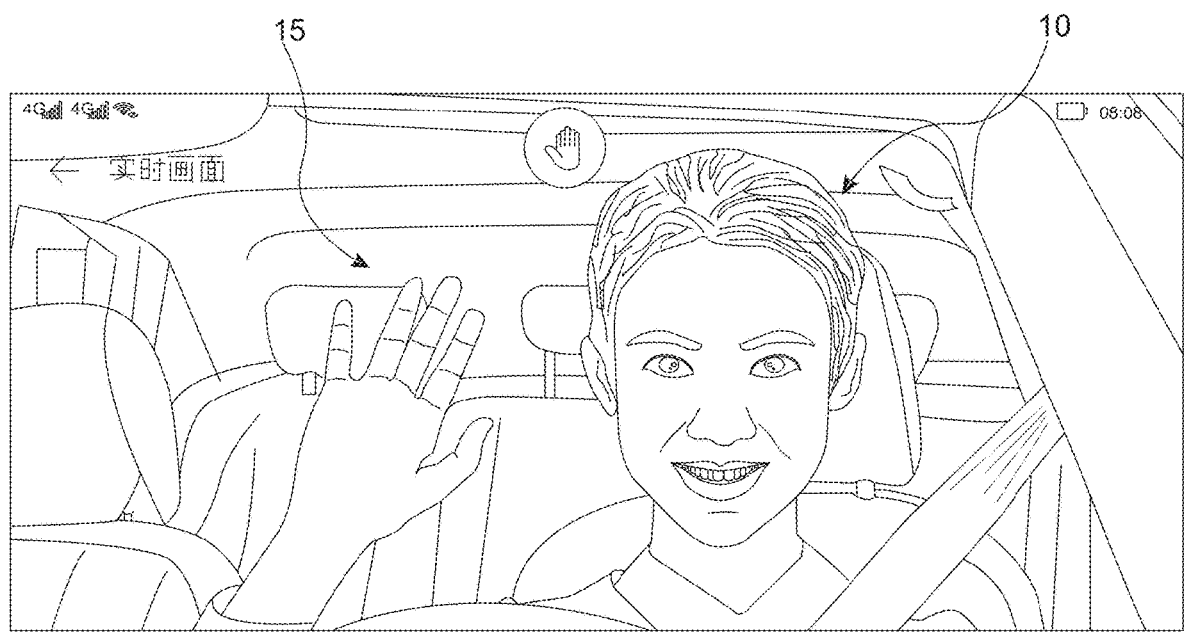
FIG. 18B is a diagram depicting a user in a vehicle including a gesture-controlled device.
Figure 18C:
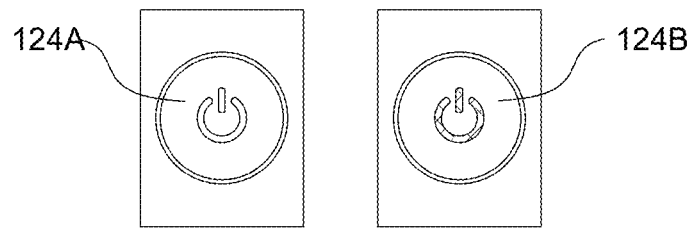
FIG. 18C depicts a power button widget in the deactivated and activated states.
Figure 18D:
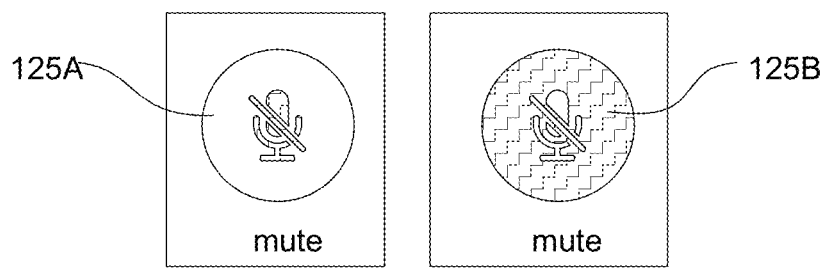
FIG. 18D depicts a mute button widget in the deactivated and activated states.

In some example embodiments, a toggle control may be used to activate or deactivate a particular function. A virtual widget for a toggle control may be activated by push mid-air gestures. In some cases, such widgets are usable in vehicles such as passenger car. For example, FIG. 18B depicts a user 10 in a passenger car 15. The user 10 may need to power on or power off an electronic device in the vehicle. For example, with reference to FIG. 18C, a power button widget is shown in deactivated mode 124A and activated mode 124B. As another example, with reference to FIG. 18D, there is shown a mute button control in a deactivated mode 125A and activated mode 125B. The power button 124 and the mute button 125 are toggle push button controls which may be activated by a push mid-air gesture or a push-and-release mid-air gesture as described with reference to FIGS. 18E and 18F.

Figure 18E:
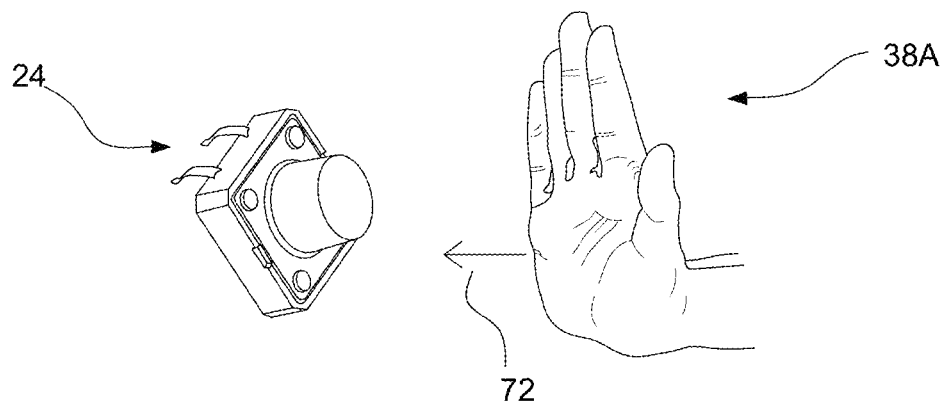
FIG. 18E depicts a push mid-air hand gesture used to activate a push toggle button, in accordance with example embodiments of the present disclosure.
Figure 18F:
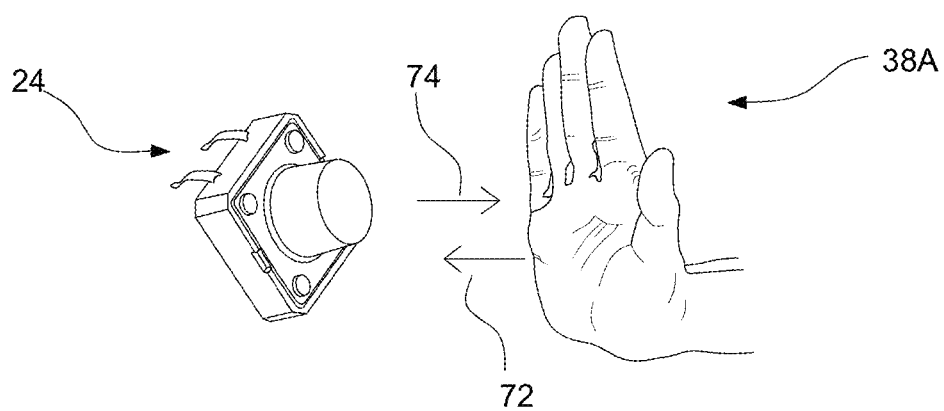
FIG. 18F depicts a push-and-release mid-air hand gesture used to activate a push toggle button, in accordance with example embodiments of the present disclosure.

FIG. 18E shows a push mid-air gesture 38A in which a hand 35 is pushed in the direction 72. The movement of the hand 35 is similar to activating a physical toggle push button 24. The push mid-air hand gesture 38A, when recognized by a gesture recognition system 322 of a gesture-controlled device 100 may activate a virtual widget which toggles a particular function such as power or mute. FIG. 18F shows a push-and-release mid-air hand gesture 38B in which a hand 35 is pushed in the direction 72 then pulled back in the direction 74. The push-and-release mid-air gesture 38B, when recognized by a gesture recognition system 322 of a gesture-controlled device 100 may activate a virtual widget, which toggles a function such as power, or mute.

Figure 18G:
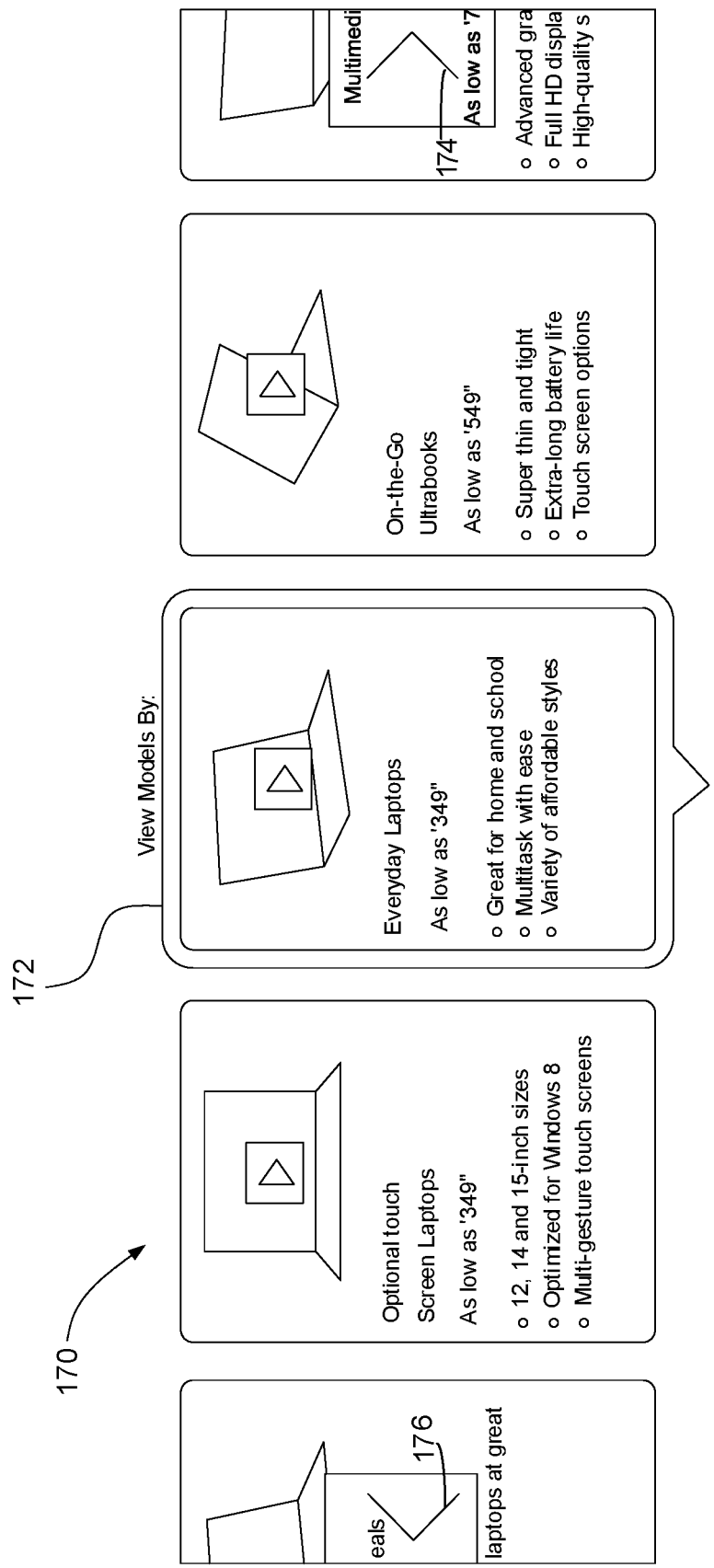
FIG. 18G depicts a conceptual view of a carousel.
Figure 18H:
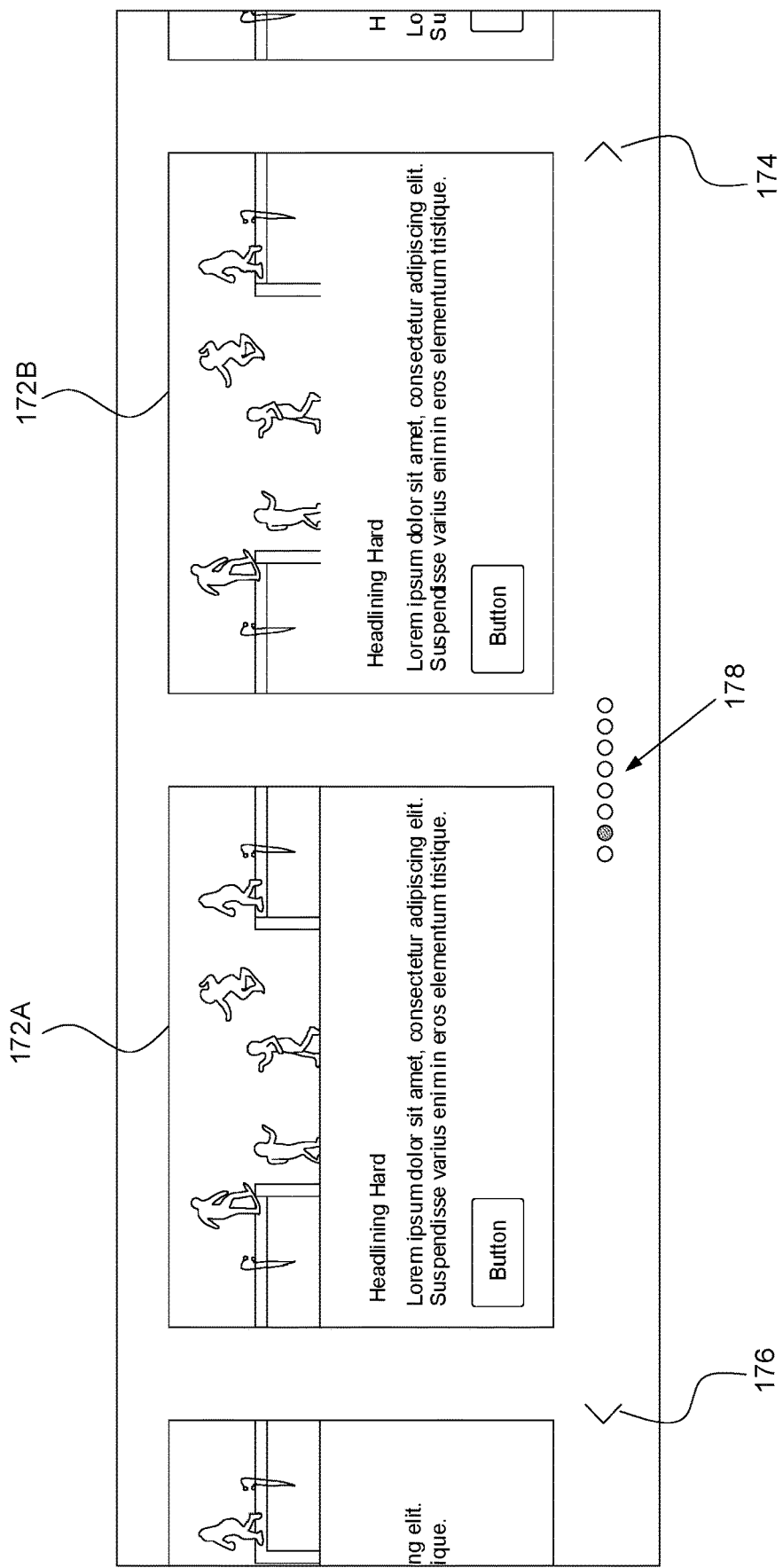
FIG. 18H depicts a carousel rendered on a display of a gesture-controlled device.

A carousel 170, shown in FIG. 18G, is comprised of a plurality of carousel elements. Each carousel element 172 contains a user interface, text or images. Select carousel elements 172 may be shown on a display of an electronic device. A carousel may include a forward arrow 174 and a back arrow 176. In response to activating an arrow, the elements of the carousel 170 are rotated showing different elements 172. FIG. 18H depicts a carousel 170 shown on a display of an electronic device. The display only shows elements 172A and 172B. As before, the carousel includes a forward arrow 174 and a back arrow 176. If the carousel 170 is rendered on a display 104 of a gesture-controlled device 100, then one way to rotate the carousel 170, and show different carousel elements 172 is to perform a directional mid-air gesture, such as a slap gesture, as shown in FIGS. 18I and 18J.

Figure 18I:
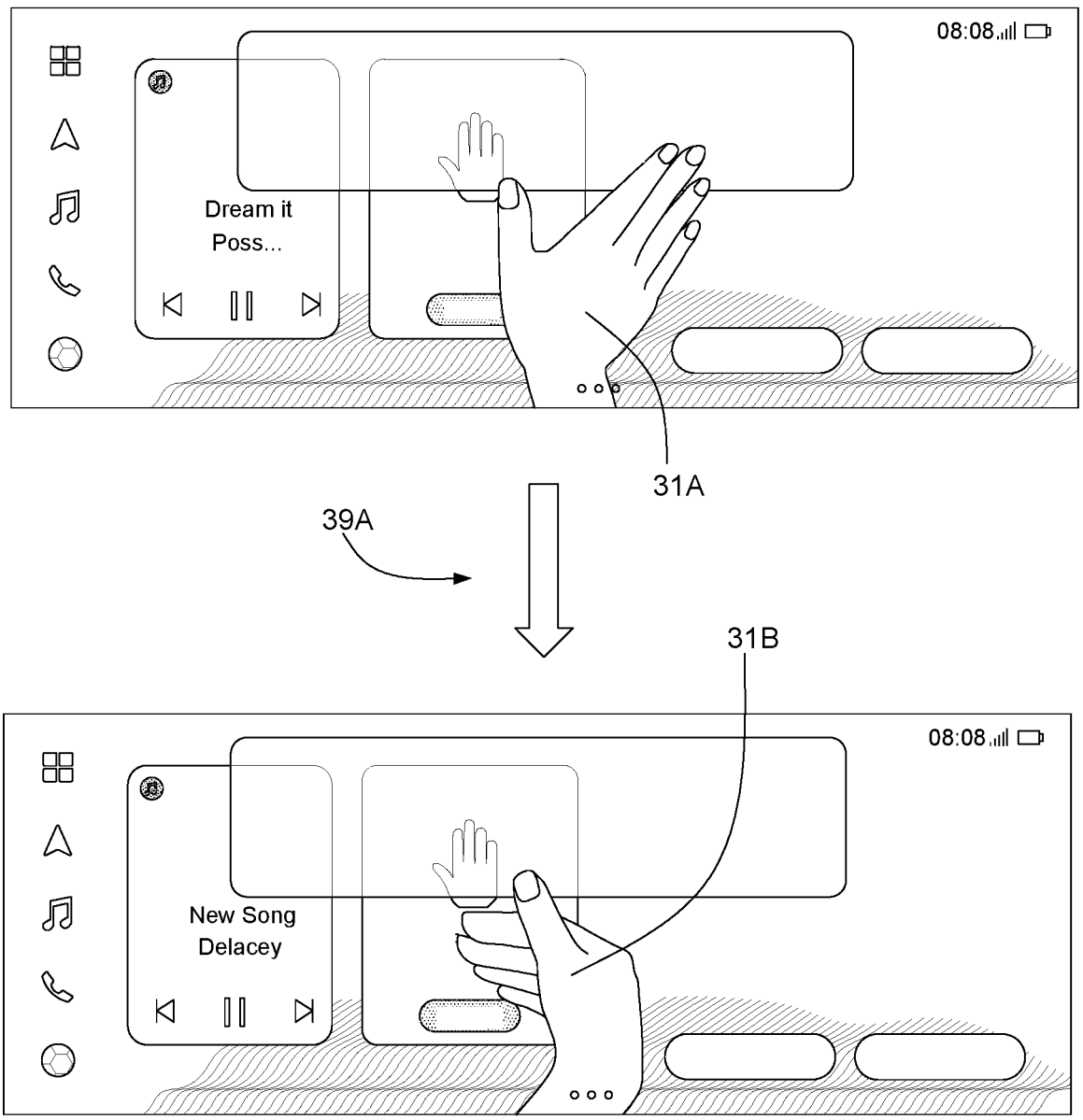
FIG. 18I depicts a slap mid-air gesture used to rotate a carousel on a display of a gesture-controlled device, in accordance with example embodiments of the present disclosure.

With reference to FIG. 18I, there is shown a slap gesture 39A in which a hand 35 starts in an initial slap position 31A and moves (from the wrist mainly) to a final slap position 31B. In response to recognizing the slap gesture 39A, the gesture-controlled device 100 rotates the carousel by one position in the direction of the gesture. Similarly, with reference to FIG. 18J, there is shown a reverse slap gesture 39B in which the hand is moved from the final slap position 31B to the initial slap position 31A. In response to recognizing the reverse slap gesture 39B, the gesture-controlled device 100 rotates the carousel by one positon in the direction of the gesture, which is the opposite direction of the slap gesture 39A.

Figure 18J:
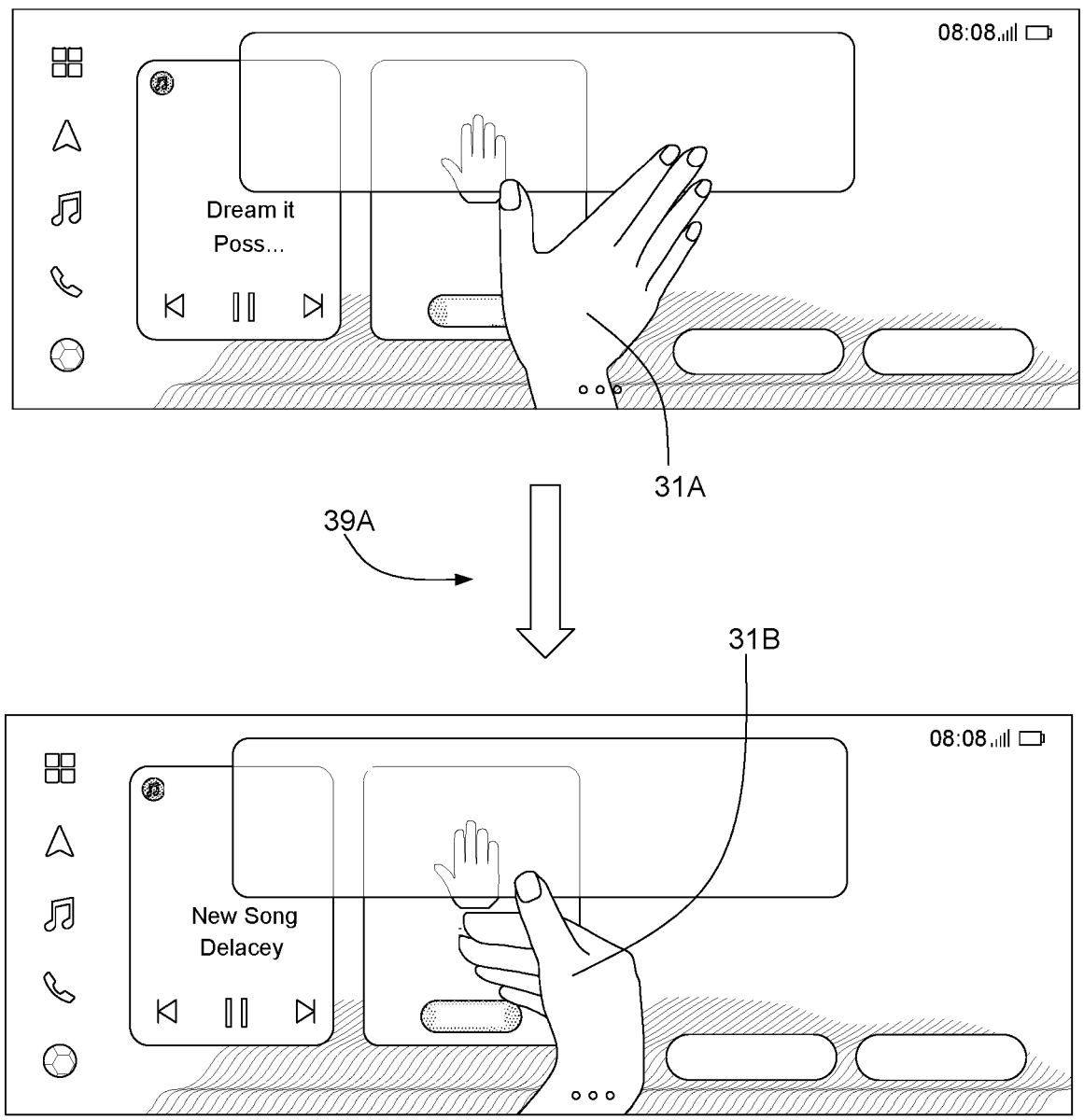
FIG. 18J depicts a reverse slap mid-air gesture used to rotate a carousel on a display of a gesture-controlled device, in accordance with example embodiments of the present disclosure.

While the embodiments of FIGS. 18I and 18J use a slap gesture and a reverse slap gesture to rotate the carousel, other gestures are possible. For example, a mid-air swipe gesture in which the hand is moved across the carousel may be used to rotate the carousel. In a mid-air swipe gesture the user moves the forearm at the elbow (as opposed to moving the hand at the wrist in case of a slap gesture) such that the hand is moved across. The gesture-controlled device, in response to recognizing the mid-air swipe gesture, rotates the carousel by one position.

Figure 19A:
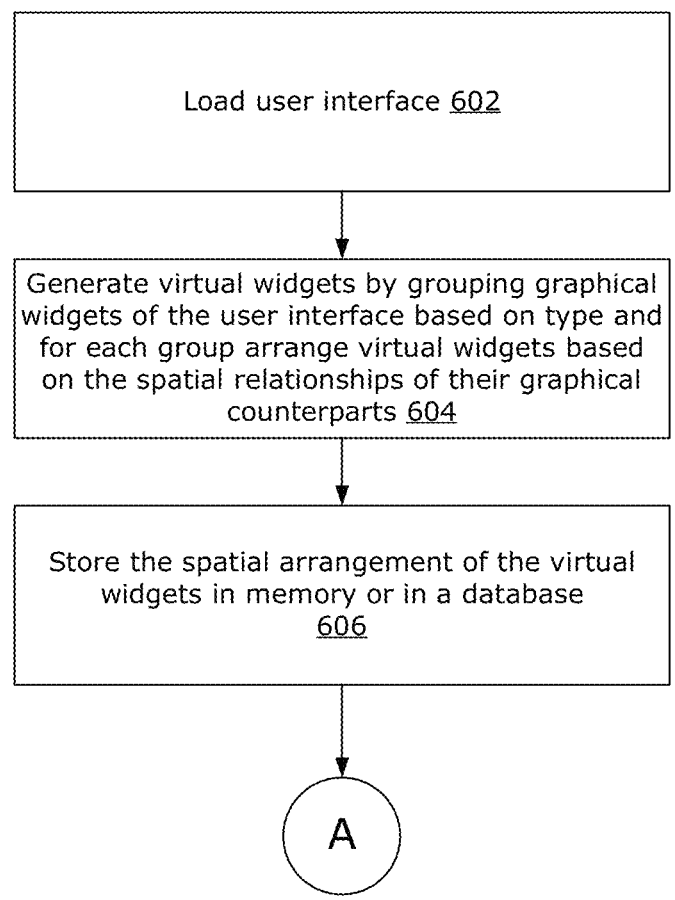
FIGS. 19A and 19B depict a flow diagram for a method of activating a virtual widget using mid-air hand gestures, in accordance with example embodiments of the present disclosure.
Figure 19B:
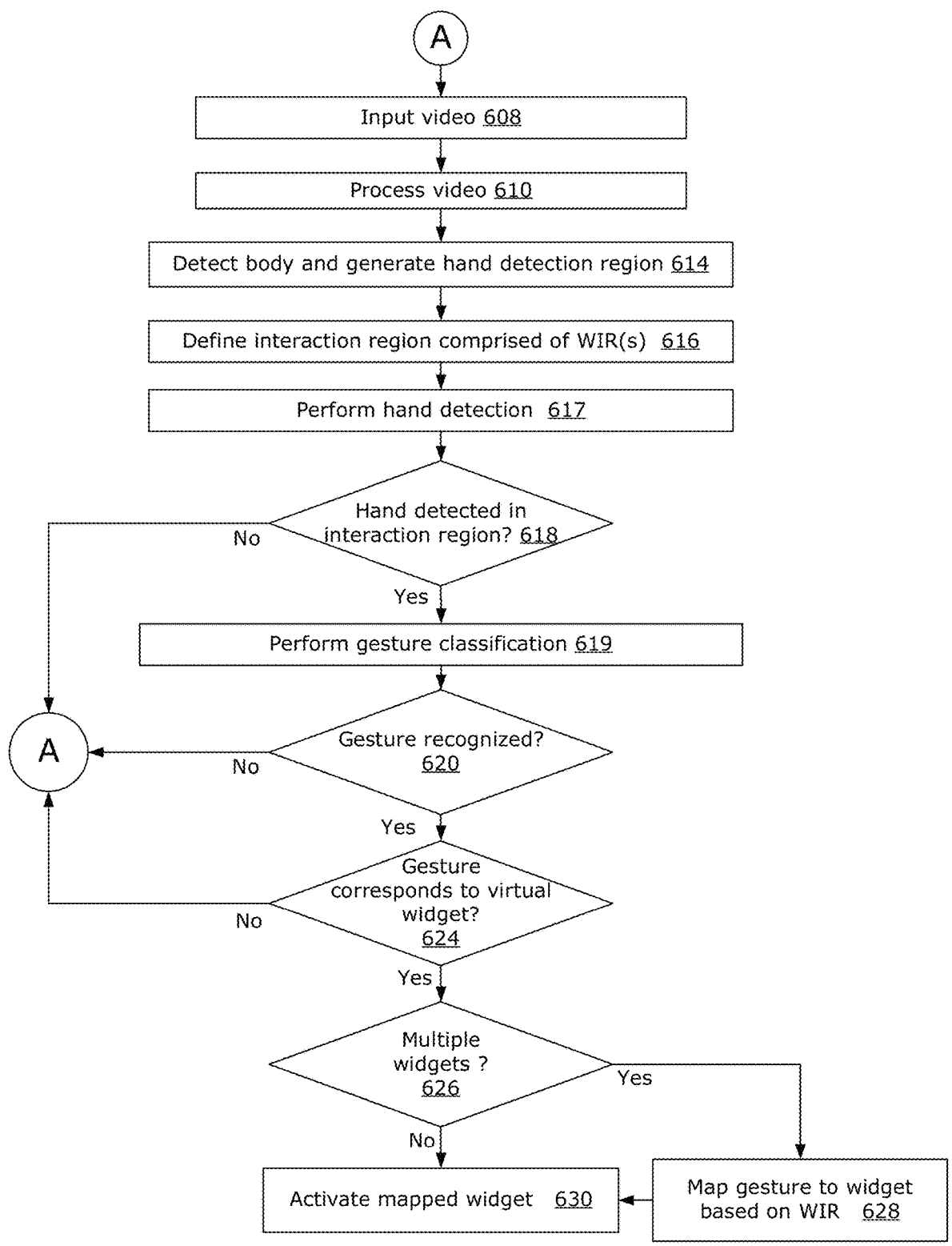

FIGS. 19A-19B depict a method for controlling virtual widgets by mid-air gestures in a gesture-controlled device, in accordance with embodiments of the present disclosure. In some embodiments, wherein the gesture-controlled device has a display, the user interface is rendered on a viewing area 114 of a display 104. In other embodiments, wherein the gesture-controlled device does not have a display or is in a mode in which the display is disabled, a plurality of virtual widgets are defined at specific locations and/or with specific arrangements which are not dependent on a user interface on a display. In this case, FIG. 19A, which is comprised of steps 602-604 is not part of the method, and the method starts at Step 608.

For embodiments in which the gesture-controlled device 100 has a display 104 and a user interface on a viewing area 114, the method starts in FIG. 19A. At step 602, a user interface is loaded. Step 602 may be performed by a component of the operating system 220. At step 604, a component such as the widget controller 500 generates virtual widgets. The virtual widgets are generated by grouping graphical widgets of the user interface into a plurality of groups based on type. For example, virtual widgets that are slider controls are grouped together, while virtual widgets which are push buttons are grouped together. For each group, the virtual widgets generated are arranged based on the spatial relationships of their graphical counterparts. At step 606, the number, type and arrangement of the virtual widgets are stored either in memory or in a database for later use by the same or by other components as described below. FIG. 19A ends at connector "A" and the method is continued in FIG. 19B.

In some embodiments, FIG. 19B is a continuation of the method, which started in FIG. 19A for a gesture-controlled device, which include a display 104 and have a user interface on the viewing area 114 of the display 104. In other embodiments, FIG. 19B may be the start of the method for controlling virtual widgets by mid-air gestures for gesture-controlled devices in which virtual widgets are pre-defined and are not dependent on a loaded user interface on a display 104. FIG. 19B begins at the connector "A" then proceeds to step 608. At step 608, a video is input via an image-capturing device such as the digital camera 102. At step 610, the video is processed to facilitate detection and recognition of objects therein. At step 614, image recognition techniques known in the art may be used to detect the presence of a user's body portion, such as the head 13 or upper body 12 in the captured video. For example, a body detection and tracking subsystem 312 may analyze the video input to recognize the boundaries of the user's upper body 12 and generate a hand detection region 700 around the upper body 12. At step 616, an interaction region comprised of one or more WIRs is generated, for example by a WIR generation subsystem 314, based on the hand detection region 700, and on the number and arrangement of the virtual widgets. In some embodiments, the virtual widgets are based on displayed graphical widgets, in which case the number and arrangement of the virtual widgets was determined in step 604 and saved in step 606. In other embodiments, the virtual widgets have pre-defined locations and arrangements and WIRs correspond to the locations and arrangements of the predefined virtual widgets. At step 617, the hand detection and tracking subsystem 316 performs hand detection and tracking on the captured video frames. Hand detection and tracking comprises detecting the position and motion of the user's hand 35 to determine whether there is a hand gesture in the interaction region within the video frames. Furthermore, the hand detection and tracking subsystem 316 passes the position and motion information related to the user's hand to the gesture recognition subsystem 322. At step 618, if no hand was detected in the interaction region then control goes back to step 608, via the junction "A", to capture more video frames. If, however, a hand was detected in the interaction region, then gesture classification is performed at step 619, which attempts to recognize (classify) the gesture and determine the gesture type.

At step 620, the outcome of the gesture recognition is checked. If no mid-air hand gesture has been recognized within the interaction region then control goes back to step 608, via the junction "A", to capture a new video input. If, at step 620, a mid-air hand gesture has been recognized, then control goes to step 624. At step 624, the gesture to widget mapping subsystem 400 determines whether the recognized gesture maps to a virtual widget. This determination is made based on the gesture type. If no virtual widget, which responds to or may be activated by the recognized gesture is recognized, then control goes back to step 608 via junction "A". If at least one virtual widget may process the recognized gesture, then control goes to step 626. At step 626 the gesture to widget mapping subsystem 400 checks whether multiple virtual widgets, which can process the recognized gesture, are loaded. If a single virtual widget is defined, then control goes to step 630 and the signal virtual widget is activated (or controlled) by the widget controller 500. If multiple virtual widgets are defined, then at step 628, the gesture is mapped, by the gesture to widget mapping subsystem 400, to a corresponding virtual widget based on the WIR in which the gesture is recognized. Control then goes to step 630, wherein the widget controller 500 activates the mapped virtual widget. When the mapped virtual widget is activated, the action corresponding thereto is performed. As noted earlier, in some embodiments the virtual widgets may not have corresponding graphical widgets represented on a display. In such embodiments, the location of each virtual widget may be predefined and documented such that the user may know which WIR corresponds to which virtual widget.

Figure 20A:
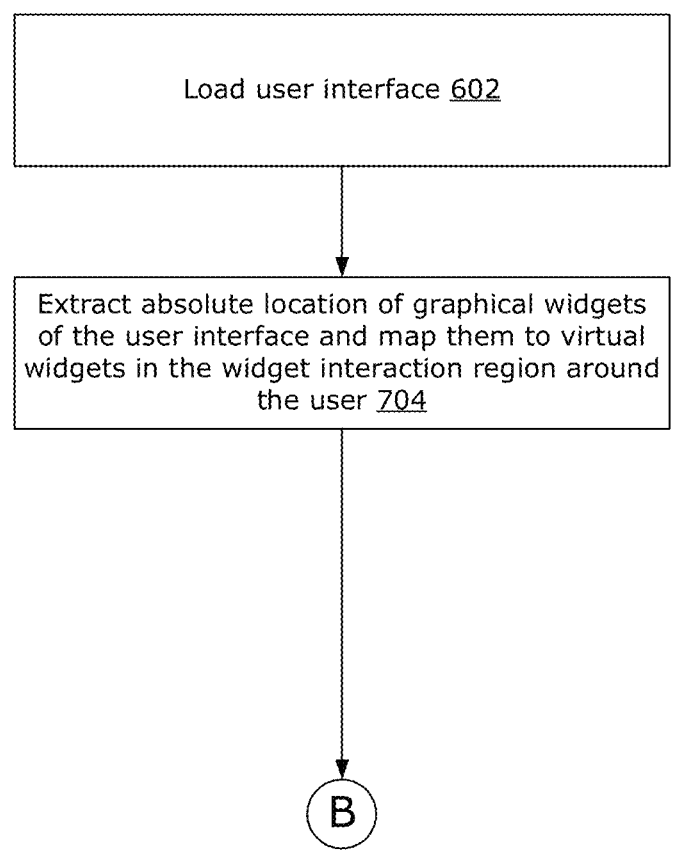
FIGS. 20A and 20B depict a flow diagram for a method of activating a virtual widget using mid-air hand gestures, in accordance with other example embodiments of the present disclosure.
Figure 20B:
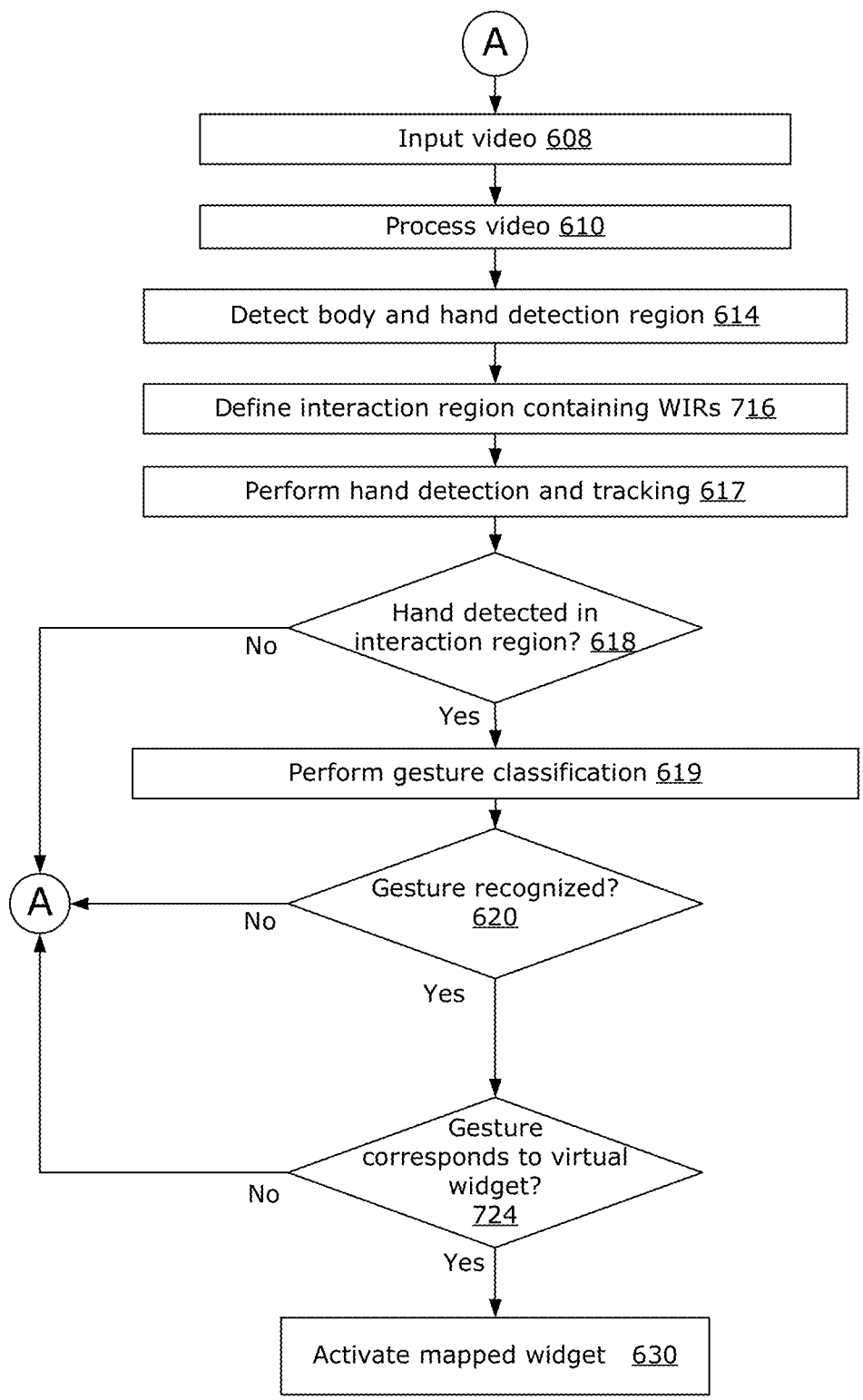

FIGS. 20A and 20B depict a method for controlling a virtual widget using mid-air hand gesture, in accordance with another embodiment of the present disclosure. FIGS. 20A and 20B are somewhat similar to FIGS. 19A and 19B, but refer to the embodiment in which the virtual widget is controlled based a location within the interaction region, rather than on a number and arrangement thereof. In some embodiments, the virtual widgets are based on graphical widgets displayed at specific locations on a display 104, as discussed above with reference to FIG. 18. For such embodiments, the method includes both FIGS. 20A and 20B. In other embodiments, the gesture-controlled device may not have a display or may not have graphical widgets. In such embodiments, the virtual widgets are predefined at specific locations within the interaction region. In such embodiments, the method includes the steps of FIG. 20B only. The steps of the method shown in FIGS. 20A and 20B, which have the same reference numerals as corresponding steps in FIGS. 19A and 19B, are identical. Therefore, such steps will not be described again for the sake of brevity. With reference to FIG. 20A, step 602 is therefore similar to step 602 described above with reference to FIG. 19A. At step 704, the operating system 220 or widget controller 500 extracts the absolute locations of the graphical widgets from the interface and maps them to virtual widgets in the widget interaction region around the user. Control then goes to step 608 of FIG. 20B via the junction "B".

Steps 608, 610 and 614 have been described above with reference to FIG. 19B. At step 716, an interaction region is generated and is comprised of a single WIR. Steps 618, 619 and 620 have been described above with reference to FIG. 20B. At step 724, the gesture to widget mapping subsystem 400 determines whether the recognized gesture maps to a virtual widget. The determination is made based on two factors. First, the location of the recognized gesture within the interaction region must correspond to the location of a virtual widget within the interaction region around the user. Second, the virtual widget must accept gestures of the gesture type of the recognized mid-air gesture. If both conditions are satisfied, control goes to step 630 wherein the mapped virtual widget is activated.

Figure 21:
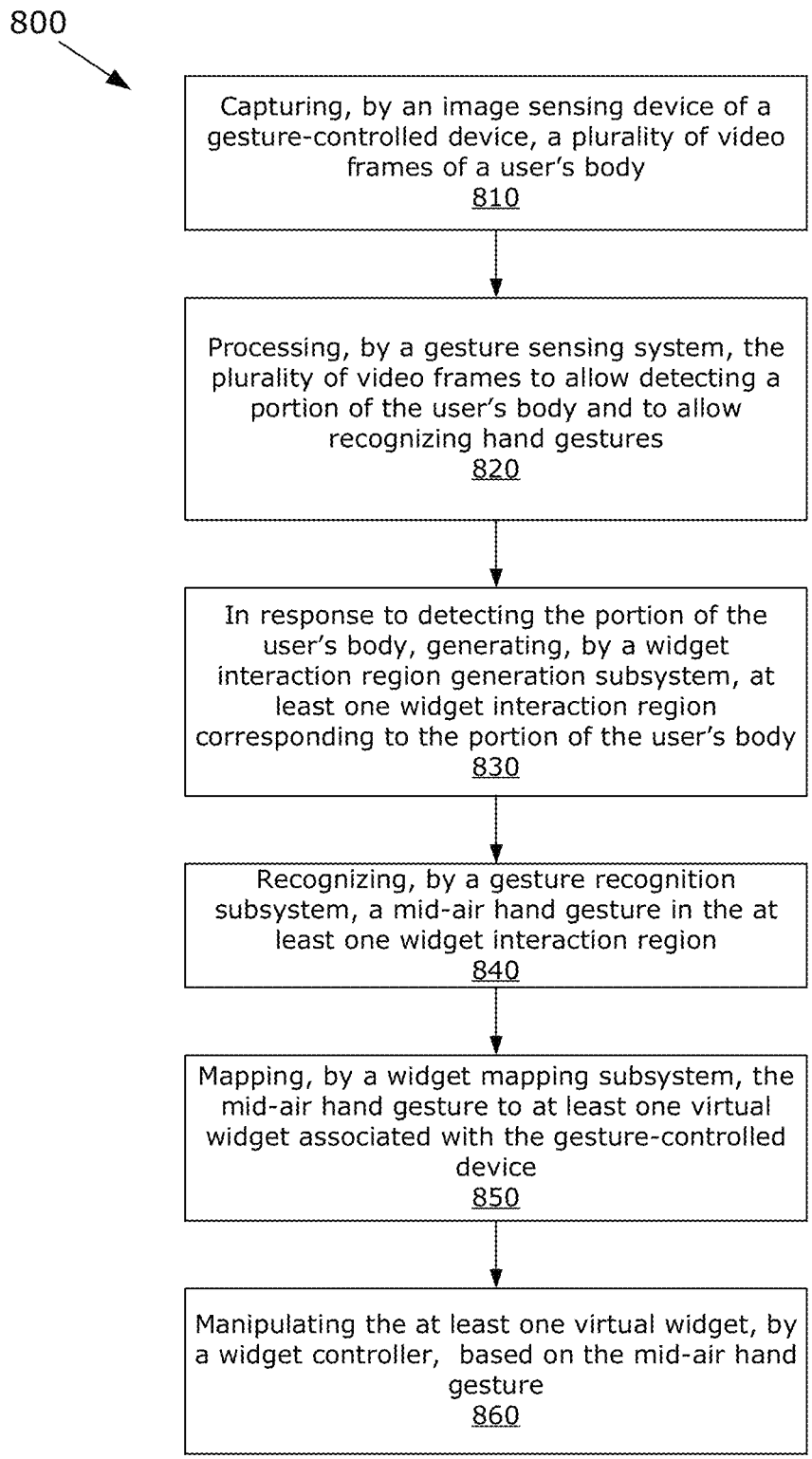
FIG. 21 is a flow diagram depicting a simplified method of manipulating a virtual widget, on a gesture-controlled device, using a mid-air hand gesture, in accordance with example embodiments.

FIG. 21 is a simplified method 800 for manipulating a virtual widget on a gesture-controlled device 100, using a mid-air hand gesture. At step 810, an image-capturing device, such as digital camera 102, of the gesture-controlled device 100 captures a plurality of video frames of a user's body. At step 820, a gesture-sensing system 300 processes the plurality of video frames to allow detecting, by a body detection and tracking subsystem 312, and to allow recognizing hand gestures by a hand detection and tracking subsystem 316. A step 830, in response to detecting the portion of the user's body, such as the upper body, generating, by an WIR generation subsystem 314, at least one WIR corresponding to the portion of the user's body. At step 840, a gesture recognition subsystem 322 recognizes a mid-air hand gesture in the at least one widget interaction region. At step 850, a widget mapping subsystem maps the mid-air hand gesture to at least one virtual widget. At step 860, a widget controller manipulates the at least one virtual widget based on the recognized mid-air hand gesture.

Figure 12:
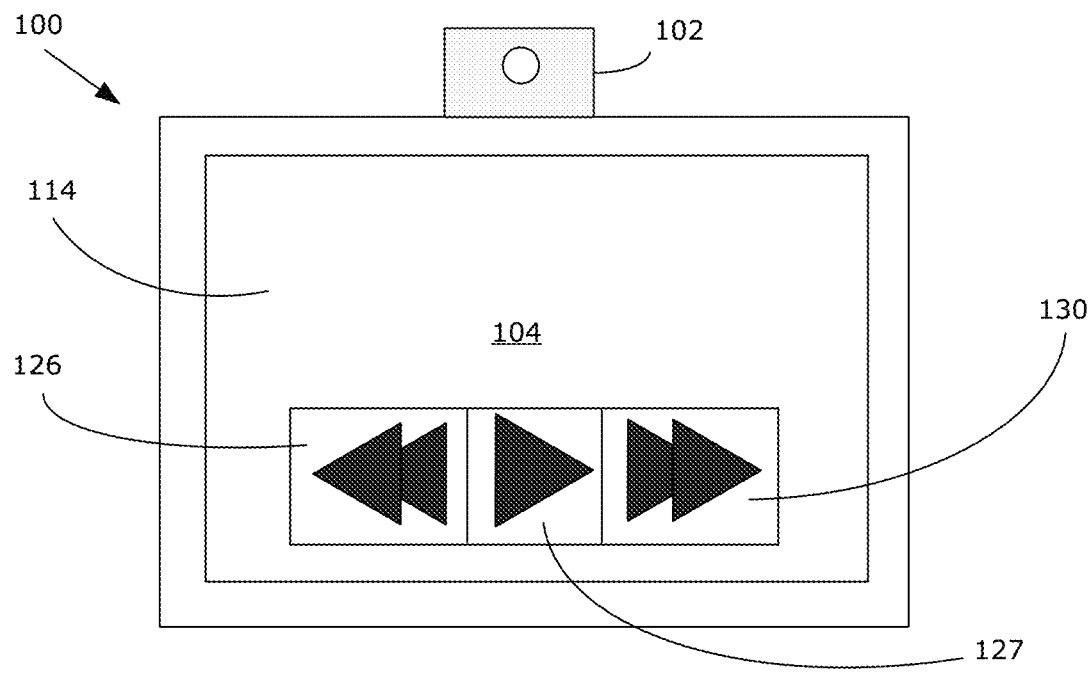
FIG. 12 is a diagram depicting the gesture-controlled device of FIG. 8 having the media player control of FIGS. 6A-6B displayed on the display thereof, in accordance with example embodiments of the present disclosure.
Figure 13:
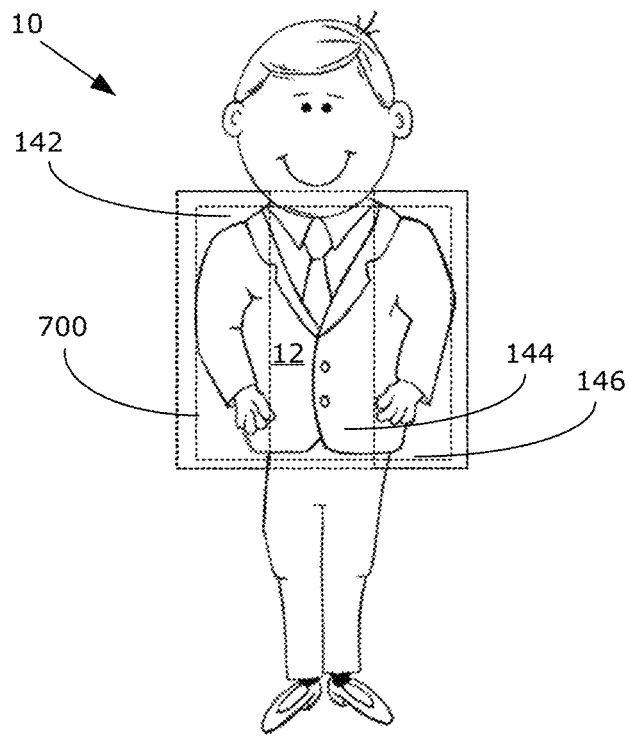
FIG. 13 is a diagram depicting a plurality of horizontally arranged widget interaction regions (WIRs) around a user's upper body, in accordance with example embodiments of the present disclosure.

The WIR generation subsystem 314 receives information about the currently loaded virtual widgets and sub-divides the WIR accordingly. As discussed above, some virtual widgets may not be displayed because either the gesture-controlled device does not have a display or the display is in a disabled mode for a particular reason. In other examples, the virtual widgets are displayed on the viewing area of a display of the gesture-controlled device. For example, as seen in FIG. 12, the WIR generation subsystem 314 has generated three vertically arranged WIRs 142, 144 and 146 based on receiving information that there are currently three virtual widgets corresponding to the three graphical widgets (buttons 126, 127 and 130) which are displayed on the viewing area of the display 104. The information about the number of virtual widgets may be provided to the WIR generation subsystem 314 by the widget controller 500 or any other system component such as the operating system 220. For example, in response to detecting a body by the body detection and tracking subsystem 312, the WIR generation subsystem 314 may query the operating system 220 for the number of currently displayed graphical widgets and generate an appropriate number of virtual widgets and WIRs that are arranged similar to their graphical counterparts. For example, FIG. 16 depicts the audiovisual control 150, which is comprised of three vertically arranged graphical widgets (slider controls 152, 155, and 158). The WIR generation subsystem 314 generates the vertically oriented WIRs 162, 164 and 166 within the WIR 120. In examples where no graphical widgets are displayed, the number and arrangement of the virtual widgets may be provided to the user by means of an audio message, a small display, or just provided in a user documentation. Accordingly, the user is aware of the number of widgets and arrangement of the WIR to assist them in performing the gesture corresponding to a particular virtual widget.

The WIR defined by the WIR generation subsystem 314 is used by the hand detection and tracking subsystem 316 to perform hand detection. In particular, the hand detection and tracking subsystem 316 may analyze only the defined WIR within the input frame. The hand detection and tracking subsystem 316 may use any suitable hand detection technique to detect a hand in the input frame.

In some examples, the body detection and tracking subsystem 312 may use a trained neural network for performing upper body 12 detection. Similarly, the hand detection and tracking subsystem 316 may use another trained neural network for performing hand detection.

The gesture recognition subsystem 322 performs identification and classification of the hand shape and movement as a gesture type. The gesture recognition subsystem 322 may use any suitable gesture typeification technique to classify the shape of the detected hand as a particular gesture type. For example, the gesture recognition subsystem 322 may use a trained neural network (e.g., a CNN) that has been trained to classify a gesture according to a predefined set of gesture types. The gesture recognition subsystem 322 outputs a label that identifies the gesture type. By limiting hand detection and gesture recognition to gestures performed within the hand detection region 700 of the WIR 120, the performance of the hand detection and tracking subsystem 316 and/or gesture recognition subsystem 322 may be improved.

The gesture type determined by the gesture parsing subsystem is mappable to a suitable virtual widget type. As discussed above, a button widget may be mapped to a tapping hand gesture, whereas a slider control virtual widget is mappable to a dragging hand gesture. A scrollbar may be mappable to a touch flick hand gesture.

The user feedback subsystem 362 provides feedback to users via the one or more input/output (I/O) interfaces 204 and output devices such as the display 104. User feedback information presented to users by the user feedback subsystem 362 may include, in some embodiments, feedback information prompting users to move their gestures into the WIR in response to detecting that the user's hand is outside the WIR. In some embodiments, the user feedback subsystem 362 is part of a display subsystem and provides feedback on the display. In other embodiments, the user feedback subsystem 362 provides user feedback through other output devices such as speakers. In gesture-controlled device having no display, the user feedback may be provided in the form of audio messages, audio beeping, LED indicators, and the like.

Although the gesture-sensing system 300 is illustrated as having different sub-blocks (or subsystems), it should be understood that this is not intended to be limiting. For example, the gesture-sensing system 300 may be implemented using greater or fewer numbers of sub-blocks (or subsystems), or may not require any sub-blocks (or subsystems). Further, functions described herein as being performed by a particular sub-block (or subsystem) may instead be performed by another sub-block (or subsystem).

While the dynamic gestures presented were dynamic mid-air dragging hand gestures and dynamic mid-air tapping hand gestures, it would be apparent to those of skill in the art that other dynamic gestures may be utilized. For example, dynamic mid-air touch-flick hand gestures may be recognized and used to scroll the contents of a display. Dynamic mid-air double touch flick hand gestures may be applied to scroll bars for fast scrolling.

While the gestures used to activate and manipulate the example virtual widgets have been dynamic gestures, it would be apparent to those of skill in the art that static gestures may also be used. For example, a static gesture of a particular type can be used to activate a button control, instead of using a dynamic tapping gesture. Similarly, a static gesture of another type when held for a short duration may be used to trigger manipulating a slider control. As an example, a gesture in which a thumb is pointing to the right may cause a slider control's sliding element to move to the right by a discrete distance.

Certain adaptations and modifications of the described embodiments can be made. Therefore, the above discussed embodiments are considered to be illustrative and not restrictive.

The invention claimed is:

1. A method, comprising:
   capturing, by an image-capturing device of a gesture-controlled device, a plurality of video frames of a user's body;
   detecting a portion of the user's body in the plurality of video frames;
   in response to detecting the portion of the user's body, generating, at least one widget interaction region relative to the user's body, based on the portion of the user's body, the at least one widget interaction region bounded relative to a location of the user's body;
   recognizing a mid-air hand gesture relative to the user's body in one of the at least one widget interaction regions;
   determining a gesture type of the mid-air hand gesture;
   mapping the mid-air hand gesture to at least one virtual widget associated with the gesture-controlled device based on the gesture type of the mid-air hand gesture and the recognizing the mid-air hand gesture in the one of the at least one widget interaction regions; and
   manipulating the at least one virtual widget based on the mid-air hand gesture.

2. The method of claim 1, further comprising extracting an absolute location of a graphical widget of a user interface of the gesture-controlled device, and mapping the graphical widget to the at least one virtual widget in the at least one widget interaction region.

3. The method of claim 1, wherein:
   the at least one virtual widget comprises a plurality of virtual widgets; and
   the plurality of the virtual widgets are predefined in the at least one widget interaction region.

4. The method of claim 1, wherein manipulating the at least one virtual widget is only done when the gesture type of the mid-air hand gesture corresponds to a type of the at least one virtual widget.

5. The method of claim 1, wherein the mid-air hand gesture comprises a mid-air tapping hand gesture; the at least one virtual widget comprises one of: a push button control, a radio button control, or a check box control; and manipulating the at least one virtual widget comprises activating one of: the push button control, the radio button control, or the check box control.

6. The method of claim 1, wherein the mid-air hand gesture comprises a push mid-air hand gesture or a push-and-release mid-air hand gesture, the at least one virtual widget comprises a toggle push button, and manipulating the at least one virtual widget comprises toggling the toggle push button.

7. The method of claim 1, wherein the mid-air hand gesture comprises a mid-air slap gesture or a mid-air swipe gesture, the at least one virtual widget comprises a carousel, and manipulating the at least one virtual widget comprises rotating the carousel based on a direction of the mid-air slap gesture or the mid-air swipe gesture.

8. The method of claim 1, wherein:
   the mid-air hand gesture comprises a dragging mid-air hand gesture;
   recognizing the mid-air hand gesture comprises determining a dragging direction of the dragging mid-air hand gesture;
   the at least one virtual widget comprises a slider control; and
   manipulating the at least one virtual widget comprises moving a sliding element of the slider control in the dragging direction.

9. The method of claim 1, wherein:
   the at least one virtual widget comprises a plurality of virtual widgets;
   generating the at least one widget interaction region comprises generating a plurality of widget interaction regions equal in number to a number of virtual widgets in the plurality of virtual widgets; and
   mapping, the mid-air hand gesture to the at least one virtual widget is based on the recognizing of the mid-air hand gesture in a widget interaction region of the plurality of widget interaction regions, the widget interaction region of the plurality of widget interaction regions corresponding to the at least one virtual widget of the plurality of virtual widgets.

10. A gesture-controlled device comprising:
    an image-capturing device;
    a processor;
    a memory coupled to the processor, the memory storing machine-executable instructions which, when executed by the processor, cause the gesture-controlled device to:
    capture, by the image-capturing device, a plurality of video frames of a user's body;
    detect a portion of the user's body in the plurality of video frames;
    in response to detecting the portion of the user's body, generate, at least one widget interaction region relative to the user's body based on the portion of the user's body, the at least one widget interaction region bounded relative to a location of the user's body;
    recognize a mid-air hand gesture relative to the user's body in one of the at least one widget interaction regions;
    determine a gesture type of the mid-air hand gesture;
    map the mid-air hand gesture to at least one virtual widget associated with the gesture-controlled device based on the gesture type of the mid-air hand gesture and the recognizing the mid-air hand gesture in the one of the at least one widget interaction regions; and
    manipulate the at least one virtual widget based on the mid-air hand gesture.

11. The gesture-controlled device of claim 10, wherein the machine-executable instructions further cause the gesture-controlled device to extract an absolute location of a graphical widget of a user interface of the gesture-controlled device, and map the graphical widget to the at least one virtual widget in the at least one widget interaction region.

12. The gesture-controlled device of claim 10, wherein:
    the at least one virtual widget comprises a plurality of virtual widgets; and
    the plurality of the virtual widgets are predefined in the at least one widget interaction region.

13. The gesture-controlled device of claim 10, wherein the machine-executable instructions which cause the gesture-controlled device to manipulate the at least one virtual widget is only done when the gesture type of the mid-air hand gesture corresponds to a type of the at least one virtual widget.

14. The gesture-controlled device of claim 10, wherein:
    the mid-air hand gesture comprises a mid-air tapping hand gesture;

the at least one virtual widget comprises one of: a push button control, a radio button control, and a check box control; and the instructions which cause the gesture-controlled device to manipulate the at least one virtual widget comprise instructions which cause the gesture-controlled device to activate one of: the push button control, the radio button control, and the check box control.

15. The gesture-controlled device of claim 10, wherein:

the mid-air hand gesture comprises a push mid-air hand gesture or a push-and-release mid-air hand gesture;

the at least one virtual widget comprises a toggle push button; and the instructions which cause the gesture-controlled device to manipulate the at least one virtual widget comprise instructions which cause the gesture-controlled device to toggle the toggle push button.

16. The gesture-controlled device of claim 10, wherein:

the mid-air hand gesture comprises a mid-air slap gesture or a mid-air swipe gesture;

the at least one virtual widget comprises a carousel; and the instructions which cause the gesture-controlled device to manipulate the at least one virtual widget comprise instructions which cause the gesture-controlled device to rotate the carousel based on a direction of the mid-air slap gesture or the mid-air swipe gesture.

17. The gesture-controlled device of claim 10, wherein:

the mid-air hand gesture comprises a dragging mid-air hand gesture;

the instructions which cause the gesture-controlled device to recognize the mid-air hand gesture comprise instructions which cause the gesture-controlled device to determine a dragging direction of the dragging mid-air hand gesture;

the at least one virtual widget comprises a slider control; and the instructions which cause the gesture-controlled device to manipulate the at least one virtual widget comprise instructions which cause the gesture-controlled device to move a sliding element of the slider control in the dragging direction.

18. A non-transitory computer-readable medium having machine-executable instructions stored thereon, the machine-executable instructions, when executed by a processor of a gesture-controlled device, cause the gesture-controlled device to:

capture, by an image-capturing device of the gesture-controlled device, a plurality of video frames of a user's body;

detect a portion of the user's body in the plurality of video frames;

in response to detecting the portion of the user's body, generate, at least one widget interaction region relative to the user's body based on the portion of the user's body, the at least one widget interaction region bounded relative to a location of the user's body;

recognize a mid-air hand gesture relative to the user's body in one of the at least one widget interaction regions;

determine a gesture type of the mid-air hand gesture;

map the mid-air hand gesture to at least one virtual widget associated with the gesture-controlled device based on the gesture type of the mid-air hand gesture and the recognizing the mid-air hand gesture in the one of the at least one widget interaction regions; and manipulate the at least one virtual widget based on the mid-air hand gesture.

19. The method of claim 1, wherein generating the at least one widget interaction region comprises:

generating at least one around-body interaction region including at least one body landmark of the user's body as a spatial reference for the around-body interaction region; and generating the at least one widget interaction region based on the around-body interaction region.

20. The gesture-controlled device of claim 10, wherein the instructions which cause the gesture-controlled device to generate the at least one widget interaction region comprise instructions which cause the gesture-controlled device to:

generate at least one around-body interaction region including at least one body landmark of the user's body as a spatial reference for the around-body interaction region; and generate, the at least one widget interaction region based on the around-body interaction region.

* * * * *